(12) United States Patent  
Müller

(10) Patent No.: US 7,938,627 B2
(45) Date of Patent: May 10, 2011

(54) WOVEN TURBOMACHINE IMPELLER

(75) Inventor: Norbert Müller, Haslett, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 979 days.

(21) Appl. No.: 11/667,373

(22) PCT Filed: Nov. 11, 2005

(86) PCT No.: PCT/US2005/041085
§ 371 (c)(1),
(2), (4) Date: May 9, 2007

(87) PCT Pub. No.: WO2007/013892
PCT Pub. Date: Feb. 1, 2007

(65) Prior Publication Data
US 2007/0297905 A1 Dec. 27, 2007

Related U.S. Application Data

(60) Provisional application No. 60/627,423, filed on Nov. 12, 2004.

(51) Int. Cl.
*F04D 29/26* (2006.01)
(52) U.S. Cl. ........... 416/230; 416/229 A; 416/241 A; 416/189; 416/198 R; 416/198 A; 416/175; 29/889.2
(58) Field of Classification Search .......... 416/230, 416/229 A, 234, 241 A, 241 R, 189, 175, 416/198 R, 198 A; 29/889.2; 62/506, 114
See application file for complete search history.

(56) References Cited

U.S. PATENT DOCUMENTS

| 2,399,394 A | * | 4/1946 | Seippel ............. 60/39.45 |
| 2,857,094 A | | 10/1958 | Erwin |
| 3,084,511 A | * | 4/1963 | Klapproth ............. 60/39.45 |
| 3,248,046 A | | 4/1966 | Feltman, Jr. et al. |
| 3,403,844 A | | 10/1968 | Stoffer |
| 3,501,090 A | | 3/1970 | Stoffer |
| 3,549,444 A | | 12/1970 | Katz |
| 3,632,460 A | | 1/1972 | Palfreyman et al. |

(Continued)

FOREIGN PATENT DOCUMENTS

DE 451 236 10/1927

(Continued)

OTHER PUBLICATIONS

Kharazi et al., "An Application of Wave Rotor Technology for Performance Enhancement of R718 Refrigeration Cycles", Aug. 16, 2004, AIAA 2004-5636.*

(Continued)

*Primary Examiner* — Ninh H Nguyen
(74) *Attorney, Agent, or Firm* — Harness, Dickey & Pierce, P.L.C.

(57) ABSTRACT

An impeller is provided that may be used in compressors or turbines. In another aspect of the present invention, a fiber or a bundle of fibers is woven to form at least two blades of an impeller. Yet another aspect of the present invention employs a peripheral component woven around impeller blades. An additional conductive fiber or bundle of fibers is woven into the impeller in a further aspect of the present invention. Moreover, an aspect of the present invention provides a chilling system that includes at least one compressor, at least one wave rotor, and a refrigerant.

92 Claims, 15 Drawing Sheets

U.S. PATENT DOCUMENTS

| | | |
|---|---|---|
| 3,645,829 A | 2/1972 | Palfreyman et al. |
| 3,670,382 A | 6/1972 | Keehan |
| 3,718,952 A | 3/1973 | Palfreyman et al. |
| 3,726,619 A | 4/1973 | Adams |
| 3,756,310 A | 9/1973 | Becker |
| 3,797,559 A | 3/1974 | Paul et al. |
| 3,828,573 A | 8/1974 | Eskeli |
| 3,869,808 A | 3/1975 | Sawyer |
| 3,952,798 A | 4/1976 | Jacobson et al. |
| 3,977,728 A | 8/1976 | Mitchell et al. |
| 4,002,414 A | 1/1977 | Coleman, Jr. et al. |
| 4,005,587 A | 2/1977 | Eskeli |
| 4,044,824 A | 8/1977 | Eskeli |
| 4,098,559 A | 7/1978 | Price |
| 4,114,962 A | 9/1978 | König et al. |
| 4,147,473 A | 4/1979 | Bufalov et al. |
| 4,171,623 A | 10/1979 | Lavigne, Jr. et al. |
| 4,182,402 A | 1/1980 | Adrian |
| 4,255,087 A | 3/1981 | Wackerle et al. |
| 4,309,621 A | 1/1982 | Litz |
| 4,340,627 A | 7/1982 | Herzog et al. |
| 4,363,602 A | 12/1982 | Martin |
| 4,367,413 A | 1/1983 | Nair |
| 4,460,531 A | 7/1984 | Harris et al. |
| 4,463,553 A | 8/1984 | Boudigues |
| 4,468,269 A | 8/1984 | Carey |
| 4,483,214 A | 11/1984 | Mayer |
| 4,582,128 A | 4/1986 | Jarreby |
| 4,597,835 A | 7/1986 | Moss |
| 4,627,890 A | 12/1986 | Porter et al. |
| 4,676,722 A * | 6/1987 | Marchal et al. ............... 416/188 |
| 4,701,157 A | 10/1987 | Potter |
| 4,719,746 A | 1/1988 | Keller |
| 4,747,900 A | 5/1988 | Angus |
| 4,786,347 A | 11/1988 | Angus |
| 4,790,808 A | 12/1988 | Piramoon |
| 4,817,453 A | 4/1989 | Breslich, Jr. et al. |
| 4,860,610 A | 8/1989 | Popper et al. |
| 4,973,521 A | 11/1990 | Graff et al. |
| 5,052,898 A | 10/1991 | Cook |
| 5,108,262 A | 4/1992 | Crane |
| 5,116,205 A | 5/1992 | Kirchhofer |
| 5,119,886 A | 6/1992 | Fletcher et al. |
| 5,154,580 A | 10/1992 | Hora |
| 5,267,432 A | 12/1993 | Paxson |
| 5,274,994 A | 1/1994 | Chyou et al. |
| 5,297,384 A | 3/1994 | Paxson |
| 5,344,686 A | 9/1994 | Heubert |
| 5,424,902 A | 6/1995 | Shida et al. |
| 5,445,216 A | 8/1995 | Cannata |
| 5,464,325 A | 11/1995 | Albring et al. |
| 5,490,760 A | 2/1996 | Kotzur |
| 5,494,413 A | 2/1996 | Campen et al. |
| 5,503,222 A | 4/1996 | Dunne |
| 5,520,008 A | 5/1996 | Ophir et al. |
| 5,562,582 A | 10/1996 | Malekmadani |
| 5,639,208 A | 6/1997 | Theis |
| 5,643,168 A | 7/1997 | Piramoon et al. |
| 5,647,221 A * | 7/1997 | Garris, Jr. ............... 62/116 |
| 5,717,263 A * | 2/1998 | Cox ............... 310/74 |
| 5,876,322 A | 3/1999 | Piramoon |
| 5,894,719 A | 4/1999 | Nalim et al. |
| 5,904,470 A | 5/1999 | Kerrebrock et al. |
| 5,916,125 A | 6/1999 | Snyder |
| 5,921,754 A | 7/1999 | Freitas et al. |
| 5,931,640 A | 8/1999 | Van Houten et al. |
| 5,932,940 A | 8/1999 | Epstein et al. |
| 5,944,485 A | 8/1999 | Maumus et al. |
| 5,951,255 A | 9/1999 | Krenkel et al. |
| 6,064,123 A | 5/2000 | Gislason |
| 6,065,297 A | 5/2000 | Tischer et al. |
| 6,134,109 A | 10/2000 | Muller et al. |
| 6,138,456 A | 10/2000 | Garris |
| 6,154,352 A | 11/2000 | Atallah |
| 6,168,373 B1 | 1/2001 | Vauthier |
| 6,176,092 B1 | 1/2001 | Butterworth et al. |
| 6,185,956 B1 | 2/2001 | Brasz |
| 6,196,809 B1 | 3/2001 | Takahashi et al. |
| RE37,134 E | 4/2001 | Wilson |
| 6,238,524 B1 | 5/2001 | Zebuhr |
| 6,253,833 B1 | 7/2001 | Koster et al. |
| 6,261,419 B1 | 7/2001 | Zebuhr |
| 6,279,340 B1 | 8/2001 | Butterworth et al. |
| 6,328,094 B1 | 12/2001 | Mori et al. |
| 6,351,934 B2 | 3/2002 | Snyder |
| 6,381,948 B1 | 5/2002 | Klingels |
| 6,388,346 B1 | 5/2002 | Lopatinsky et al. |
| 6,392,313 B1 | 5/2002 | Epstein et al. |
| 6,393,208 B1 | 5/2002 | Nosenchuck |
| 6,402,467 B1 | 6/2002 | Godichon et al. |
| 6,427,453 B1 | 8/2002 | Holtzapple et al. |
| 6,427,464 B1 | 8/2002 | Beaverson et al. |
| 6,449,939 B1 | 9/2002 | Snyder |
| 6,460,342 B1 | 10/2002 | Nalim |
| 6,499,955 B2 * | 12/2002 | Choi et al. ............... 416/185 |
| 6,505,462 B2 | 1/2003 | Meholic |
| 6,526,936 B2 | 3/2003 | Nalim |
| 6,531,788 B2 | 3/2003 | Robson |
| 6,583,528 B2 | 6/2003 | Gabrys |
| 6,584,764 B2 | 7/2003 | Baker |
| 6,606,854 B1 | 8/2003 | Siefker et al. |
| 6,887,032 B2 | 5/2005 | Favre-Felix et al. |
| 6,974,309 B2 | 12/2005 | Seki |
| 7,240,515 B2 | 7/2007 | Conry |
| 7,555,891 B2 | 7/2009 | Muller et al. |
| 2001/0052228 A1 | 12/2001 | Rakhmailov |
| 2002/0038555 A1 | 4/2002 | Zebuhr |
| 2002/0047329 A1 | 4/2002 | Sashino et al. |
| 2002/0071979 A1 | 6/2002 | DuBose et al. |
| 2002/0125780 A1 | 9/2002 | Shiratori |
| 2002/0141894 A1 | 10/2002 | Kirtley et al. |
| 2003/0000336 A1 | 1/2003 | Tsai |
| 2003/0017053 A1 | 1/2003 | Baldwin et al. |
| 2003/0025335 A1 | 2/2003 | Elder |
| 2003/0079713 A1 | 5/2003 | Nalim |
| 2003/0084888 A1 | 5/2003 | LeBold et al. |
| 2003/0205213 A1 | 11/2003 | Aquino et al. |
| 2003/0235502 A1 | 12/2003 | Van Dine et al. |
| 2005/0155450 A1 * | 7/2005 | Jennings ............... 74/572.12 |
| 2005/0193713 A1 | 9/2005 | Kovasity et al. |

FOREIGN PATENT DOCUMENTS

| | | |
|---|---|---|
| DE | 1 403 611 A1 | 11/1969 |
| DE | 43 21 173 | 1/1995 |
| DE | 195 43 181 | 5/1997 |
| DE | 297 14 566 | 10/1997 |
| DE | 196 34 043 | 2/1998 |
| EP | 0 657 654 | 6/1995 |
| FR | 2 504 209 | 10/1982 |
| FR | 2 631 083 | 11/1989 |
| GB | 1 244 349 A | 8/1971 |
| GB | 1 534 525 A | 12/1978 |
| GB | 2 099 518 | 12/1982 |
| GB | 2 161 110 A | 1/1986 |
| WO | WO 97/13979 | 4/1997 |
| WO | WO 03/072946 | 9/2003 |

OTHER PUBLICATIONS

"R718-Turbo Kaltwassersatz" (technical brochure from ILK-PROJEKTGESELLSCHAFT mbH, LUFT-UND KALTETECHNIK); including translation; 5 pages ; 2003.

Mitsubishi Heavy Industries, Ltd.; Technical Review; vol. 41, No. 2; Apr. 2004; pp. 1-5.

Peeples, John W.; "Vapor Compression Cooling for High Performance Applications"; ElectronicsCooling, vol. 7, No. 3; Aug. 2001; pp. 16-24.

Wilson, Jack et al.; Wave Rotor Optimization for Gas Turbine Engine Topping Cycles; Journal of Propulsion and Power, vol. 12, No. 4; Jul.-Aug. 1996; pp. 778-785.

Oguri, Yasufumi et al.; "Research on Adaptation of Pressure Wave Supercharger (PWS) to Gasoline Engine"; SAE Technical Paper Series; 2001-01-0368; Mar. 5-8, 2001; pp. 1-7.

Heisler Heinz; Advanced Engine Technology; ISBN 1 56091 7342, SAE Technical Paper Series; 1995; pp. 356-363.

Nalim, M. Razi; "Longitudinally Stratified Combustion in Wave Rotors"; Journal of Propulsion and Power; vol. 16, No. 6; Nov.-Dec. 2000; pp. 1060-1068.

Nalim, M. Razi et al.; "Two-Dimensional Flow and Nox Emissions in Deflagrative Internal Combustion Wave Rotor Configurations"; Proceedings of ASME International Gas Turbine Institute: ASME Turbo Expo 2002; Jun. 3-6, 2002, Amsterdam, The Netherlands; GT-2002-30085; pp. 1-11.

Wilson, Jack; "Design of the NASA Lewis 4-Port Wave Rotor Experiment"; NASA Contractor Report 202351, AIAA-97-3139; Jun. 1997; pp. 1-6.

Azoury, P.H.; Engineering Applications of Unsteady Fluid Flow; ISBN 0 471 92968 9, 1992; 156 pages.

Pottish, Nancy; "A Filament Winder Buyer's Guide—Aug. 2005"; Composite World; www.compositesworld.com/ct/issues/2005/August/947/3; Aug. 2005; 3 pages.

McClean Anderson; Technical Advertisement for Advanced Filament Winding Equipment; 2005; 1 page.

McClean Anderson; Technical Advertisement for WSH—Super Hornet Winder; 2005; 1 page.

"Filament Winder"; Technical Advertisement from http://atlas.usafa.af.mil/dfem/facilities/myweb/filament_winder.htm; Dec. 14, 2000; 1 page.

Automated Dynamics; "Thermoplastic Composite Parts" and "Automated Fiber Placement Equipment"; http://www.automateddynamics.com; 2004; 2 pages.

Entec Composite Machines, Inc.; Technical Advertisement for Entec Composite Machines: Filament Winding and Pultrusion Equipment for Composite Manufacturing; http://www.entec.com; (believed to have been published prior to Nov. 2004); 1 page.

Seki, Wataru, et al.; Highest-Efficiency in the World, Variable Speed Drive Turbo Chiller NART-I Series; Mitsubishi Heavy Industries, Ltd; Technical Review; vol. 41, No. 2; Apr. 2004; pp. 1-5.

"R718-Turbo Kaltwassersatz" (technical brochure from ILK-PROJEKTGESELLSCHAFT mbH, LUFT-UND KALTETECHNIK); including translation; (believed to have been published before Nov. 2004); 5 pages.

Müller, Norbert, et al.; "Performance Analysis Of Brayton and Rankine Cycle Microsystems For Portable Power Generation"; Proceedings of ASME International Mechanical Engineering Congress & Exposition; Nov. 17-22, 2002; New Orleans, Louisiana; IMECE2002-39628; pp. 1-10.

Müller, Norbert, et al.; "Optimization And Design Guidelines For High Flux Micro-Channel Heat Sinks For Liquid And Gaseous Single-Phase Flow"; IEEE Inter Society Conference on Thermal Phenomena; 0-7803-7152; Jun. 2002; pp. 449-456.

Müller, Norbert; "Ein Schneller Algorithmus für Entwurf und Berechnung von Laufrädern mit Radialfaserschaufeln"; in Klingenberg J., Heller W.; Beiträge Zur Strömungsmechanik, TV Desden; 2001; pp. 235-244.

Akbari, Pezhman, et al.; "Performance Improvement Of Small Gas Turbines Through Use Of Wave Rotor Topping Cycles"; Proceedings of ASME Turbo Expo 2003, Power for Land, Sea, and Air; Jun. 16-19, 2003; Atlanta, Georgia, USA; GT2003-38772; pp. 1-11.

Akbari, Pezhman, et al.; "Gas Dynamic Design Analyses Of Charging Zone For Reverse-Flow Pressure Wave Superchargers"; Proceedings of ICES03 2003 Spring Technical Conference of the ASME Internal Combustion Engine Division; May 11-14, 2003; Salzburg, Austria; ICES2003-690; pp. 1-11.

Müller, Norbert; "Design of Compressor Impellers for Water as a Refrigerant"; ASHRAE Transactions: Research; 2001; vol. 107; pp. 214-222.

Caterpillar; "Tech of the Week—New Pressure Wave Supercharger Improves Engine Performance, Reduces Emissions"; (believed to have been published or publically used prior to Nov. 12, 2004); 2 pages.

J. Kühnl-Kinel; "New Age Water Chillers With Water As Refrigerant"; ST Division—Cooling and Ventilation Group (ST/CV) CERN, Geneva, Switzerland; (believed to have been published before Nov. 2004); 6 pages.

Müller, Norbert; "Turbo Chillers Using Water as a Refrigerant"; ASME Process Industry Division PID Newsletter; Fall 2002; p. 3.

Entec Composite Machines, Inc; "Filament Winding"; http://www.entec.com/filament%20winding; (believed to have been published prior to Nov. 12, 2004); 2 pages.

Lachner, Jr., Brandon F.; "The Use of Water as a Refrigerant: Impact of Cycle Modifications on Commercial Feasbility," A Thesis Submitted in Partial Fulfillment of the Requirements for the Degree of Master of Science (Mechanical Engineering) at the Unversity of Wisconsin-Madison; May 2004, 247 pages.

"Mini Generator Has Enough Power To Run Electronics;" Georgia Institute of Technology (Nov. 24, 2004); 2 pages.

Akbari, P. et al.; "A Review of Wave Rotor Technology and Its Applications;" IMECE2004-60082, Proceedings of IMECE04 2004 ASME International Mechanical Engineering Congress, Nov. 2004; pp. 1-23.

Akbari, P. et al.; "Performance Improvement of Recuperated and Unrecuperated Microturbines Using Wave Rotor Machines;" Paper No. 218, CIMAC Congress, Kyoto, 2004; pp. 1-13.

Akbari, P. et al.; "Preliminary Design Procedure for Gas Turbine Topping Reverse-Flow Wave Rotors;" GTSJ, IGTC2003Tokyo FR-301, Proceedings of the International Gas Turbine Congress, Nov. 2003; pp. 1-8.

Akbari, P. et al.; "Utilizing Wave Rotor Technology to Enhance the Turbo Compression in Power and Refrigeration Cycles;" IMECE2003-44222, Proceedings of IMECE03 2003 ASME International Mechanical Engineering Congress and Exposition, Nov. 2003; pp. 1-9.

Ashley, S.; "Turbines on a Dime;" XP-000727170, Mechanical Engineering ASME, vol. 199, No. 10, Oct. 1997; pp. 78-81.

Berlinger, B.; "New Pressure Wave Supercharger Improves Engine Performance, Reduces Emissions;" Caterpillar, Tech of the Week (believed to have been published or publically used prior to Nov. 12, 2004); 2 pages.

Capstone C60 Natural Gas (MicroTurbine)—Product Datasheet, Capstone Turbine Corp. (2003); 2 pages.

Frackowiak, M. et al.; "Numerical Simulation of Unsteady-Flow Processes in Wave Rotors;" DRAFT IMECE2003-60973, Proceedings of IMECE04 2004 ASME International Mechanical Engineering Congress, Nov. 2004; pp. 1-16.

Iancu, F. et al.; "Feasibility Study of Integrating Four-Port Wave Rotors into Ultra-Micro Gas Turbines (UµGT);" XP-002391768, 40th AIAA/ASME/SAE/ASEE Joint Propulsion Conference and Exhibit, Jul. 2004; pp. 1-12.

Kentfield, J.; "Wave-Rotors and Highlights of their Development;" AIAA98-3248, 34th AIAA/ASME/SAE/ASEE Joint Propulsion Conference and Exhibit, Jul. 1998; pp. 1-9.

Kharazi, A. et al.; "Preliminary Study of a Novel R718 Turbo-Compression Cycle Using a 3-Port Condensing Wave Rotor;" GT2004-53622, Proceedings of ASME Turbo Expo Power for Land, Sea and Air, Jun. 2004; pp. 1-7.

Livermore, Carol; "Here Come The Microengines;" The Industrial Physicist (Dec. 2001/Jan. 2002); 4 pages.

Mehra, A. et al.; "A Six-Wafer Combustion System for a Silicon Micro Gas Turbine Engine;" Journal of Microelectromechanical Systems; vol. 9, No. 4, Dec. 2000; pp. 517-527.

Photograph of Comprex Axial Wave Rotor in Mazda Diesel Engine (publicly used in or before 1987); 1 page.

Piechna, J. et al.; "Radial-Flow Wave Rotor Concepts, Unconventional Designs and Applications;" DRAFT IMECE2004-59022, Proceedings of IMECE04 2004 ASME International Mechanical Engineering Congress, Nov. 2004; pp. 1-10.

Schmidt, M.; "Portable MEMS Power Sources;" 2003 IEEE International Solid-State Circuits Conference, Session 22, TD: Embedded Techologies, Paper 22.5, 8 pages.

Welch, G. et al.: "Overview of Wave-Rotor Technology for Gas Turbine Engine Topping Cycles;" U.S. Army Research Laboratory (Lewis field) (believed to have been published before Nov. 12, 2004); pp. 1-17.

Akbari, P. et al.; "Performance Investigation of Small Gas Turbine Engines Topped with Wave Rotors;" AIAA 2003-4414, 39th AIAA/ASME/SAE/ASEE Joint Propulsion Conference and Exhibit, Jul. 2003; pp. 1-11.

\* cited by examiner

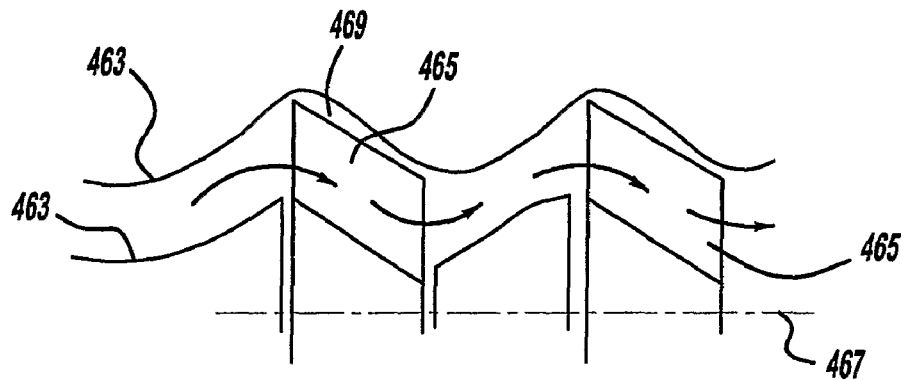
FIG - 24
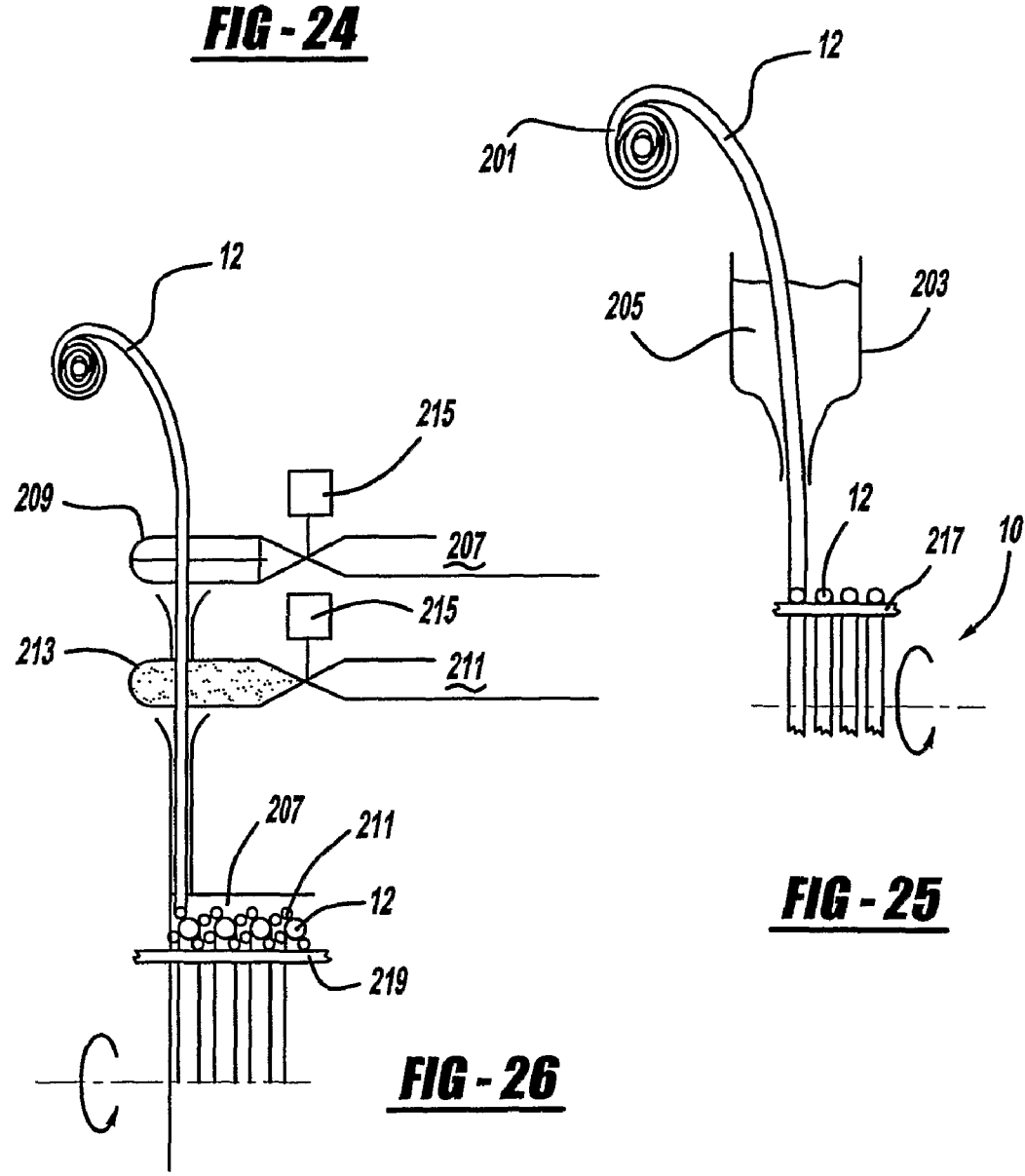
FIG - 25
FIG - 26

WOVEN TURBOMACHINE IMPELLER

CROSS REFERENCE TO RELATED APPLICATIONS

This application claims priority to U.S. Provisional patent application Ser. No. 60/627,423, filed on Nov. 12, 2004, which is incorporated by reference herein.

FIELD OF THE INVENTION

The present invention generally relates to compressors, both apparatuses and methods of use, and more specifically, to compressor impellers.

BACKGROUND

Compressors are machines that increase the pressure of a gas, vapor or mixtures of gases and vapors. The pressure of the fluid is increased by reducing the fluid's specific volume during passage of the fluid through the compressor. A cone shaped cylinder with fan blades or an impeller is an integral part in many compressors since it helps with air intake and compression fluid, as well as directing the flow through the compressor. Depending on the application, impellers may be made of many different materials such as metals or polymers and are typically fabricated by either casting, molding or machining the material.

The following U.S. Pat. No. disclose rotated members with woven fibers: U.S. Pat. No. 3,632,460, entitled "Epicyclic Weaving of Fiber Discs" which issued to Palfreyman et al. on Jan. 4, 1972; U.S. Pat. No. 3,718,952, with the same title, which issued to Palfreyman et al. on Mar. 6, 1973; U.S. Pat. No. 4,460,531, entitled "Composite Fiber Reinforced Propeller," which issued to Harris et al. on Jul. 17, 1984; U.S. Pat. No. 4,255,087, entitled "Member Formed of Fiber-Reinforced Plastic Material, such as a Rotor Blade," which issued to Wackerle et al. on Mar. 10, 1981;, and U.S. Pat. No. 5,464, 325, entitled "Turbo-Compressor Impeller for Coolant," which issued to Albring et al. on Nov. 7, 1995. All of these patents are incorporated by reference herein. These prior devices, however, are believed to be prohibitively expensive to produce in volume and do not benefit from inclusion of multifunctional component integration. Furthermore, these prior constructions employ an expensive metal coating, polymeric over-molding or a composite material, applied after fiber placement, which constitutes a greater portion of the part as compared to the fiber portion and is complicated to produce. What is needed is an impeller that is fabricated by a less expensive method other than casting or molding.

SUMMARY OF THE INVENTION

In accordance with the present invention, an impeller is provided that may be used in compressors or turbines. In another aspect of the present invention, a fiber or a bundle of fibers is woven to form at least two blades of an impeller. Yet another aspect of the present invention employs a peripheral component woven around impeller blades. An additional conductive fiber or bundle of fibers is woven into the impeller in a further aspect of the present invention. Moreover, an aspect of the present invention provides a chilling system that includes at least one compressor, at least one wave rotor, and a refrigerant.

The woven impeller of the present invention is advantageous over prior devices since the present invention is less expensive to manufacture, in part due to material differences, geometric variations and processing simplicity. The present invention impeller is also advantageous by integrating components into a multi-functional, single part. For example, conductive and/or magnetic fiber members or particle members, a shroud and/or multiple blades, are woven together by the same structural fiber or bundle of fibers. Also, electric motor integration into the impeller is employed. Moreover, sharp angles and corners can be achieved with various embodiments of the present invention. Furthermore, no molds, prepregs, or post-weaving coatings, moldings or structural assembly are required. Fluid flow is additionally improved through the weaving patterns and/or hub design. Further advantages and areas of applicability of the present invention will become apparent from the figures, detailed description and claims provided hereinafter. It should be understood that the detailed description and specific examples, while indicating various embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 23 and 24 are diagrammatic, cross-sectional views showing fluid flow paths through a series of woven impellers in two variations of the condensing wave rotor systems of the present invention;

FIGS. 25 and 26 are diagrammatic side views showing preferred embodiments of fiber wetting processing for a woven impeller of the present invention;

DETAILED DESCRIPTION

The following description of the various embodiments is merely exemplary in nature and is in no way intended to limit the invention, its application, or uses. The present invention provides a woven impeller and applications of its use.

The present invention provides woven impellers for use in compressors and more particularly, a condensing wave rotor system. Compressors are used to increase pressure of a wide variety of gases and vapors for a multitude of purposes. A refrigeration compressor is used to compress a gas formed in the evaporator. Other applications of compressors include chemical processing, gas transmission, gas turbines, turbochargers, and construction. Compressors that accelerate the fluid in a direction generally parallel to the rotating shaft consist of pairs of moving and stationary blade rows, each forming a stage. An impeller is a rotating member of a turbine, blower, fan, axial or centrifugal pump, or mixing apparatus. An impeller may also be known as a rotor.

Figure 1:
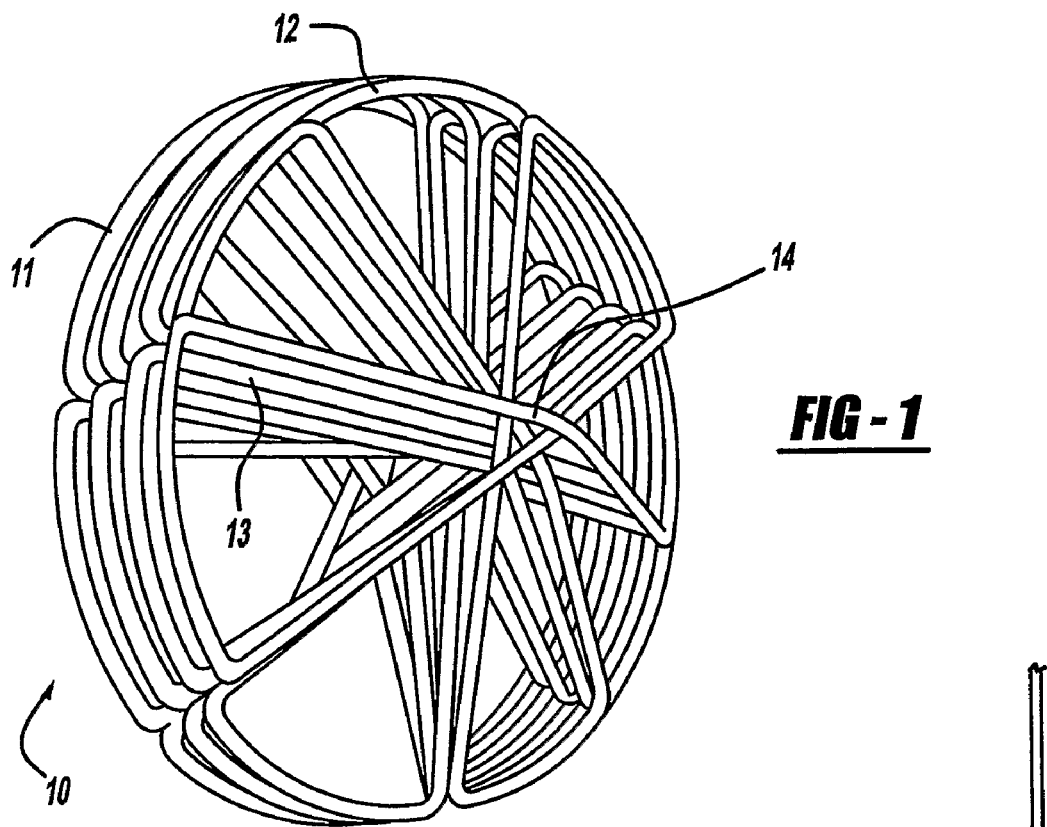
FIG. 1 is a perspective view showing a first preferred embodiment of a woven impeller of the present invention.
Figure 2:
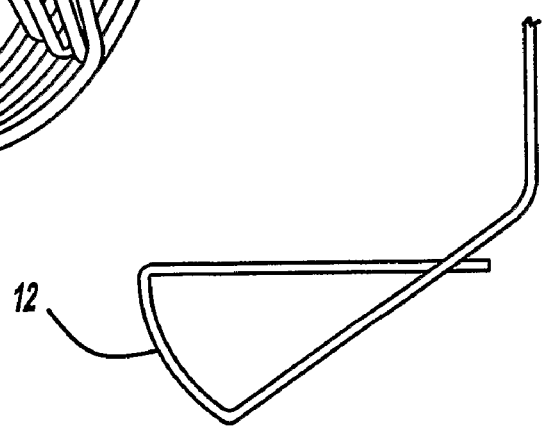
FIG. 2 is a perspective view showing a beginning step of weaving a fiber into the first preferred embodiment of the woven impeller.
Figure 3:
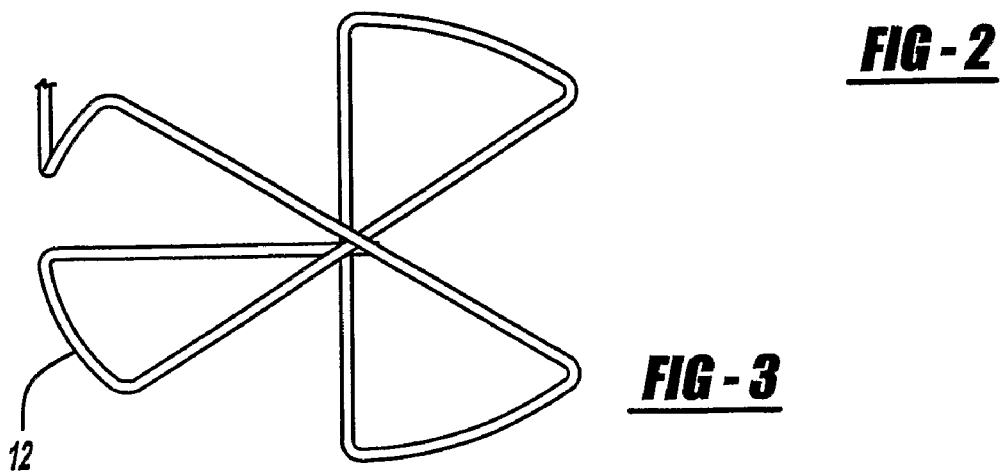
FIG. 3 is a perspective view showing a further step in weaving the fiber into the first preferred embodiment of the woven impeller.
Figure 4:
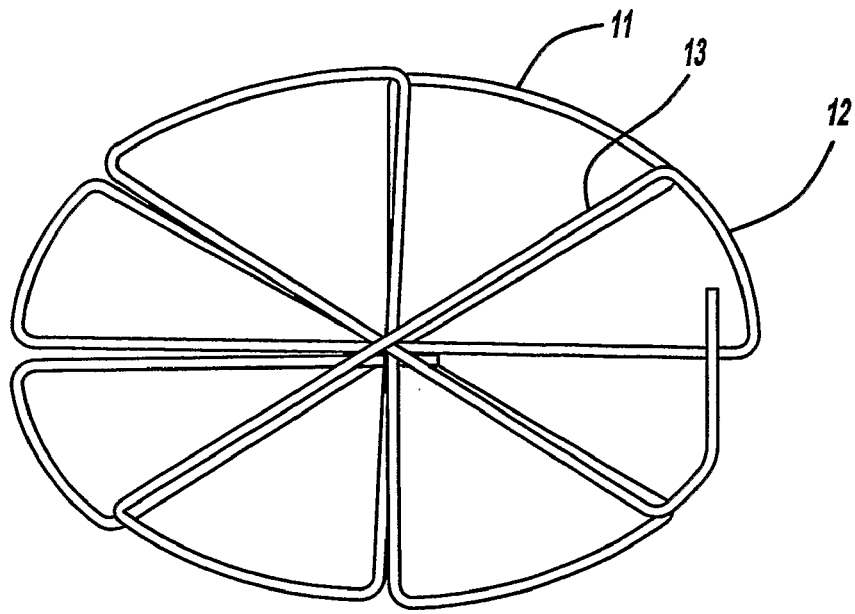
FIG. 4 is a perspective view showing one completed fiber layer of the first preferred embodiment of the woven impeller.
Figure 7:
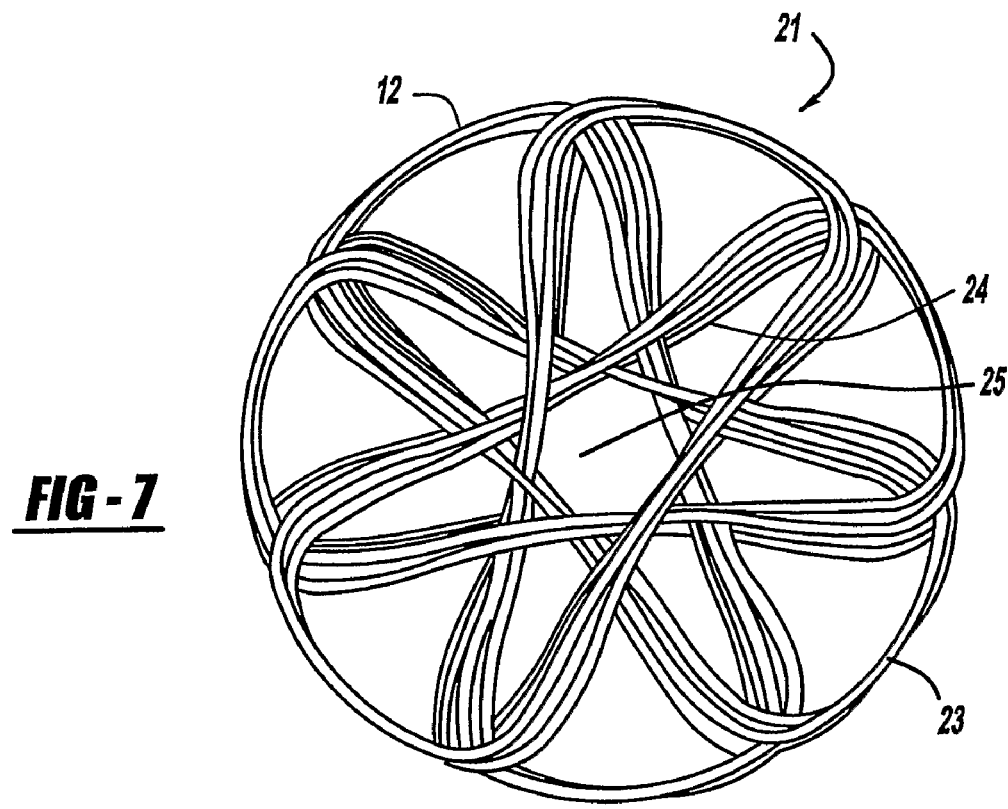
FIG. 7 is a front elevational view showing an alternate embodiment of a woven impeller of the present invention.

Referring to FIG. 1, an impeller 10 is woven from a fiber 12 and includes eight blade or vane portions 13 and a duct or shroud portion 11 which surrounds the blades. Fiber 12 is woven to form blades 13 and shroud 11, and fiber 12 crosses in the center 14 with segments thereof overlapping each other. The blades and shroud are made as an integral, single piece. FIGS. 2, 3 and 4 show how fiber 12 is woven to create peripheral shroud portion 11 and blade portions 13. Weaving may be done on a jig designed for such a pattern and woven by hand or preferably the weaving is done on a turn key system such as an automated machine that is designed to create impeller. The weaving pattern as shown in FIGS. 2, 3 and 4 may be altered to create more or less blades or may be altered to produce the alternative embodiments shown in FIGS. 7 and 18a-18q, many of which include a hollow cylindrical center portion 25 (see FIG. 7). The alternative embodiment of FIG. 7 has impeller 21 formed by fiber 12, and has blade portions 24 and a shroud portion 23. Additional uses for the alternative embodiment of FIG. 7 include a drive shaft that may be integrally woven in the area of cylindrical hollow 25 as a single piece or a drive shaft that may be attached in such an area 25 to the impeller.

The preferred embodiment process for woven impeller 10 sequentially includes fiber creation, fiber wetting, fiber winding/weaving and curing. As can be observed in FIG. 25, a spool 201 containing continuous fiber 12 is automatically fed into a resin bath 203. Resin bath 203 is preferably a tank containing resin 205 or other coating which will stick to at least the outside of fiber 12. Alternately, resin 205 can be sprayed or otherwise deposited onto fiber 12.

An alternate manufacturing process is shown in FIG. 26 wherein a first matrix material 207 of pure resin is applied to fiber 12 by way of a fist tank and dispenser assembly 209, and second matrix material 211 with ground reinforcing, magnetic or conductive particles, is subsequently or simultaneously applied to fiber 12 via a second tank and dispenser assembly 213. The flow of assemblies 209 and 213 are automatically actuated by computer (or PLC) controlled valves 215.

More specifically, resin is added in a liquid or gel form prior to or during the weaving process which is known in the art as "wetting weaving" or "fiber wetting." The resin is self-hardening so that the woven impeller hardens over time after weaving and then is removed from a jig 217 in a hardened form. In other embodiments, the resin may be an epoxy type resin such that it has two components which create the adhesion or self-hardening. The resin may be hardened by temperature and the woven impeller on a jig may be placed in an oven to enhance hardening. Alternately, the resin may be hardened through use of ultraviolet light. It is noteworthy that a mold is not required, thereby reducing capital expense and manufacturing complexity. Fiber 12 may be a prefabricated fiber with a PVC coating or other polymeric coating which is on the fiber and has any of the properties and hardening techniques as described above for resins. In any of the above embodiments, the resin, PVC or polymeric material may optionally contain electromagnetic or conductive particles and properties. The weaving or layering over jig 217 may include pins that are curved to help give a curved shape to a blade or vane of the impeller. In another variation, the fiber(s) is woven on a hollow and rigid plastic tube 219 with slots and such a plastic tube becomes part of the impeller, and acts as the primary shroud portion with the fibers acting as the blade portions. The fiber(s) are secured in the slots and may or may not be severed at the tube to avoid sharp-angle turns. The plastic tube may optionally contain magnetic or electromagnetic properties.

Figure 27:
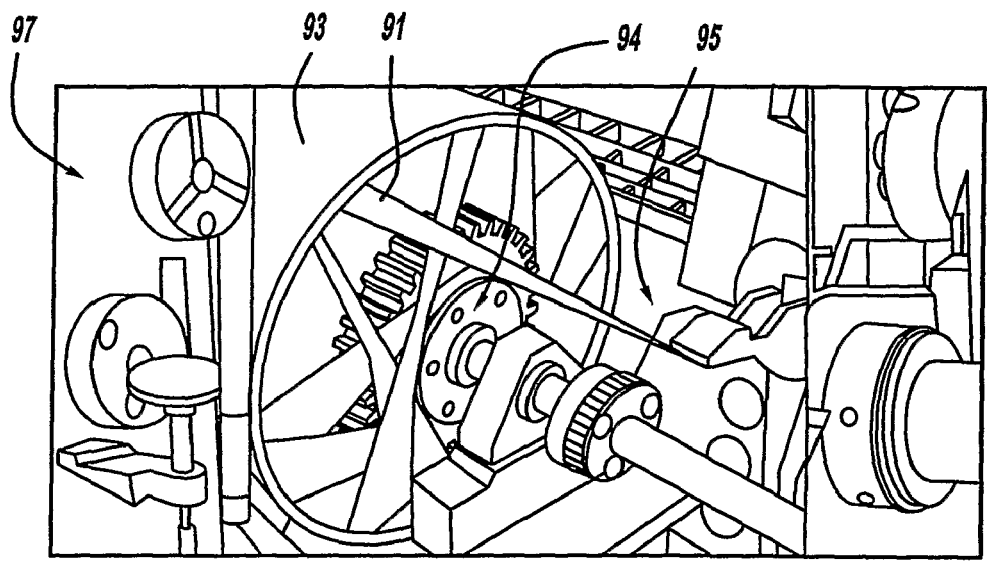
FIGS. 27 is a fragmentary, perspective view showing a fiber winding machine for a woven impeller of the present invention.

As can be viewed in FIGS. 25 and 27, a fiber placement process automatically places and winds multiple individual, resin-coated tows or fiber segments 91 onto the jig 93 or a mandrel 94 at high speed, using a numerically controlled, automatically controlled placement head to dispense, clamp, cut and restart each tow during placement. Minimum cut length (the shortest tow length a machine can lay down) is the essential ply-shape determinant. The fiber placement heads 95 are attached to a 5-axis gantry or retrofitted to a filament winding machine 97. Machines are available with dual mandrel stations to increase productivity and a two spool, five axis filament winding machine would be desirable, especially if a conductive/magnetic fiber is also employed. A WSH-Super Hornet Winder filament winding machine, which can be obtained from McClean Anderson Inc., is the preferred existing machine that is currently known but it should be appreciated that many other similar machines can be employed. Advantages of automated fiber placement fabrication include speed, reduced material scrap and labor costs, parts consolidation and improved part-to-part uniformity.

To achieve desirable properties in composite components, adhesion between fiber and matrix should be optimized. Proper adhesion requires that sufficient saturation with resin (wetout) at the fiber-matrix interface is achieved. To ensure good adhesion, attention is given to fiber surface preparation, such as the use of a surface finish or coupling agent, often termed sizing. Sizing, applied to glass and carbon filaments immediately after their formation, serves three purposes: as it enhances the fiber/matrix bond, it also eases processing and protects the fibers from breakage during processing. Although it accounts for only 0.25, to 6.0, percent of total fiber weight, sizing is a dynamic force in fiber reinforcement performance. Sizing chemistry can be optimized for manufacturing processes such as pultrusion, filament winding and weaving.

High-strength fibers used in advanced composites include not only carbon, glass and aramid, but high-modulus polyethylene ("PE"), boron, quartz, ceramic, newer fibers such as poly p-phenylene-2,6-benzobisoxazole ("PBO"), hybrid combinations, and the like. The basic fiber forms for high-performance composite applications are bundles of continuous fibers called tow. Carbon fiber tow consists of thousands of continuous untwisted filaments, with the filament count designated by a number followed by "K," indicating multiplication by 1,000, (e.g., 12K indicates a filament count of 12,000).

Carbon fiber is produced from a variety of precursors, including polyacrylonitrile ("PAN"), rayon and pitch. The precursor fibers are heated and stretched to create the high-strength fibers. PAN-based carbon fibers offer a range of properties, including good-to-excellent strength—to 1,000, ksi—and high stiffness. Pitch fibers, made from petroleum or coal tar pitches, have high-to-extremely-high stiffness and low-to-negative axial CTE. Typical aerospace-grade tow size ranges from 1K to 12K. PAN-and pitch-based 12K carbon fibers are available with a moderate (33, to 35, Msi), intermediate (40, to 50, Msi), high (50, to 70, Msi) and ultrahigh (70, to 140, Msi) modulus. (Modulus is the mathematical value that describes the stiffness of a material by measuring its deflection or change in length under loading.) Heavy tow carbon fibers have filament counts from 48K up to 320K to 35-Msi modulus and 550-ksi tensile strength.

Aramid fibers, composed of aromatic polyamide, provide exceptional impact resistance and tensile strength. Standard high-performance aramid fiber has a modulus of about 20, Msi and tensile strength of approximately 500, ksi. Commercially available high-strength, high-modulus polyethylene fibers are known for being extremely light weight, as well as for their excellent chemical and moisture resistance, outstanding impact resistance, anti-ballistic properties and low dielectric constant. However, PE fibers have relatively low resistance to elongation under sustained loading, and the upper limit of their use temperature range is about 98° C./210° F. Quartz fibers, while more expensive than glass, have lower density, higher strength and higher stiffness than E-glass, and about twice the elongation-to-break, making them a good choice where durability is a priority. Quartz fibers also have a near-zero CTE; they can maintain their performance properties under continuous exposure to temperatures as high as 1050° C./1920° F. and up to 1250° C./2280° F., for short time periods. Quartz fibers possess significantly better electromagnetic properties than glass. Ceramic fibers offer high to very high temperature resistance but low impact resistance and relatively poor room-temperature properties.

PBO is a relatively new fiber, with modulus and tensile strength almost double that of aramid fiber and a decomposition temperature almost 100° C./212° F. higher. It is suitable for high-temperature applications. Basalt fiber is an inexpensive fiber, similar to glass, but which exhibits better chemical and alkali resistance than glass. Boron fibers are five times as strong and twice as stiff as steel. They are made by a chemical vapor-deposition process in which boron vapors are deposited onto a fine tungsten or carbon filament. Boron provides strength, stiffness and is light weight, possessing excellent compressive properties and buckling resistance. Fiber hybrids capitalize on the best properties of various fiber types, and may reduce raw material costs. Hybrid composites may combine carbon/aramid and carbon/glass fibers. Natural fibers—sisal, hemp, kenaf, flax, jute and coconut are the most common—are derived from the bast or outer stem of certain plants. They have the lowest density of any structural fiber but possess sufficient stiffness and strength for some applications. All of the fibers discussed hereinabove can be used with the present invention depending upon the usage requirements and operating conditions.

In another preferred embodiment, the impeller fiber layers or segments are held together by cross-stitching. The cross-stitching may be a fiber that is similar to the impeller that is woven perpendicular to the vanes. In some of the embodiments, the cross-stitching includes an electromagnetic or conductive fiber that is different than fiber 12, as will be further described hereinafter with regard to FIG. 8. The cross weave may be a fiber made of a Nylon engineering grade polymer or another lightweight and strong material. The impeller may be generally rigid and in other embodiments, it may be generally non-rigid and flexile or pliable. In embodiments in which the impeller is non-rigid, the woven fiber impeller spins into shape when rotated in a compressor and, when not being rotated, it folds in an umbrella-like manner so that it does not impede fluid flow therepast. Typically, a non-rigid impeller is cross-stitched as opposed to using a hardening resin material on the fiber for a rigid impeller.

Figure 5:
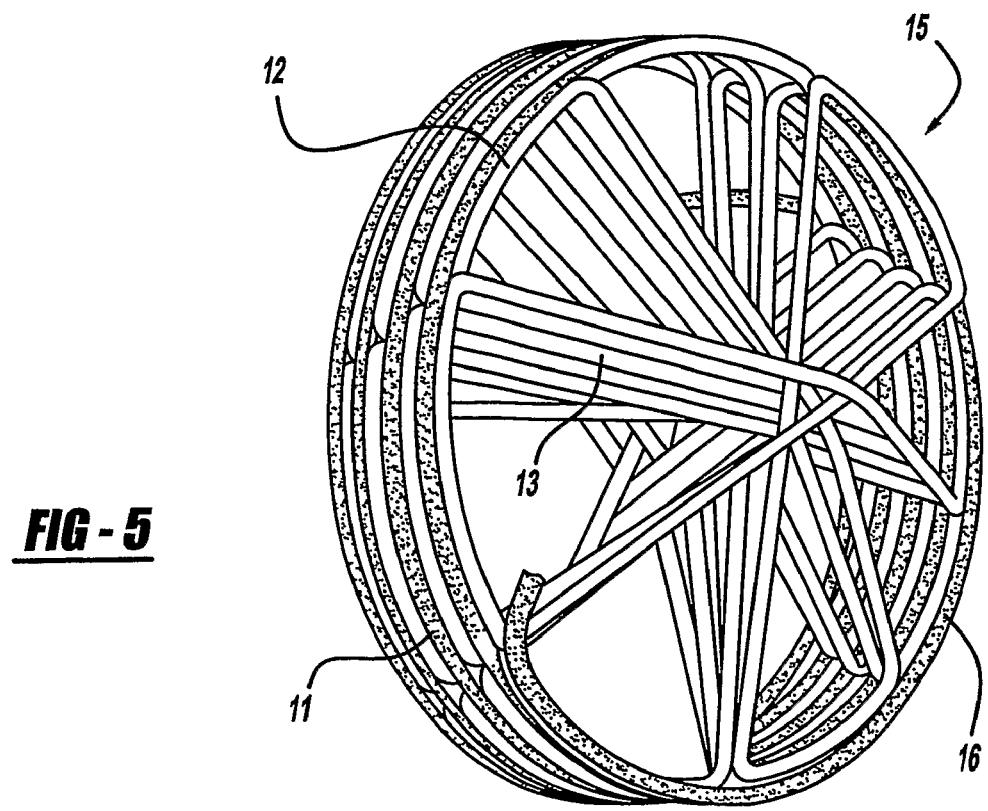
FIG. 5 is a perspective view showing a second preferred embodiment of a woven impeller of the present invention, with an electromagnetic or conductive material.
Figure 6:
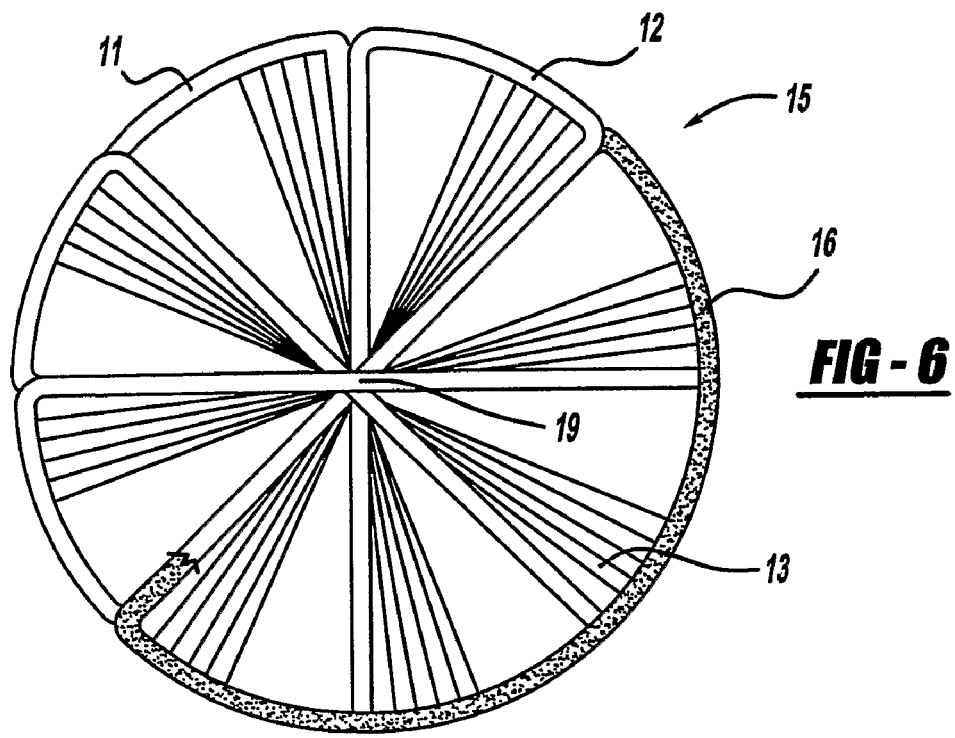
FIG. 6 is a front elevational view showing the second preferred embodiment of the woven impeller of FIG. 5.
Figure 8:
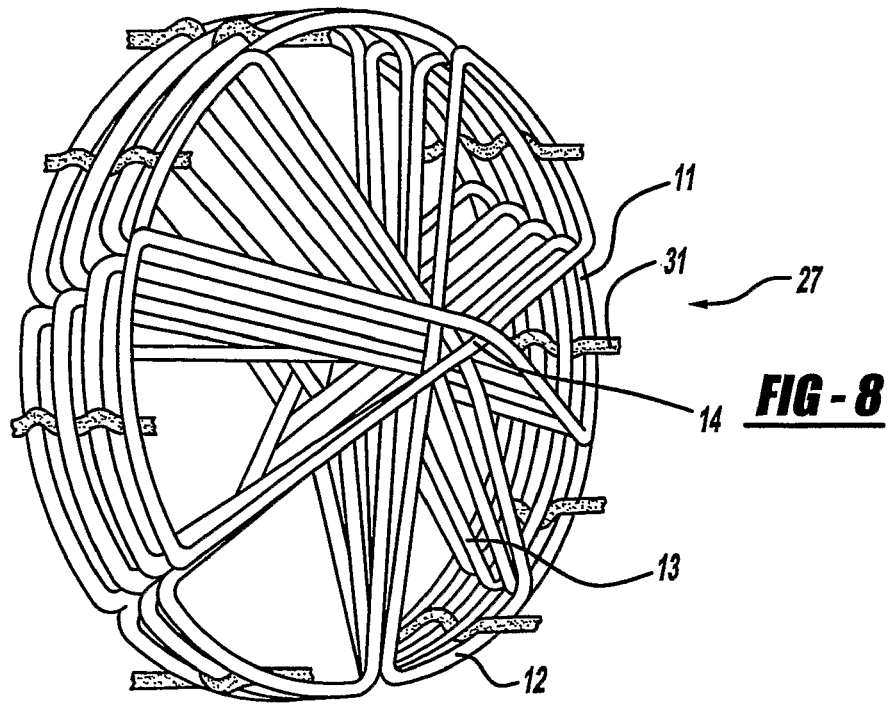
FIG. 8 is a perspective view showing a third preferred embodiment of a woven impeller, with an electromagnetic or conductive fiber, of the present invention.
Figure 9:
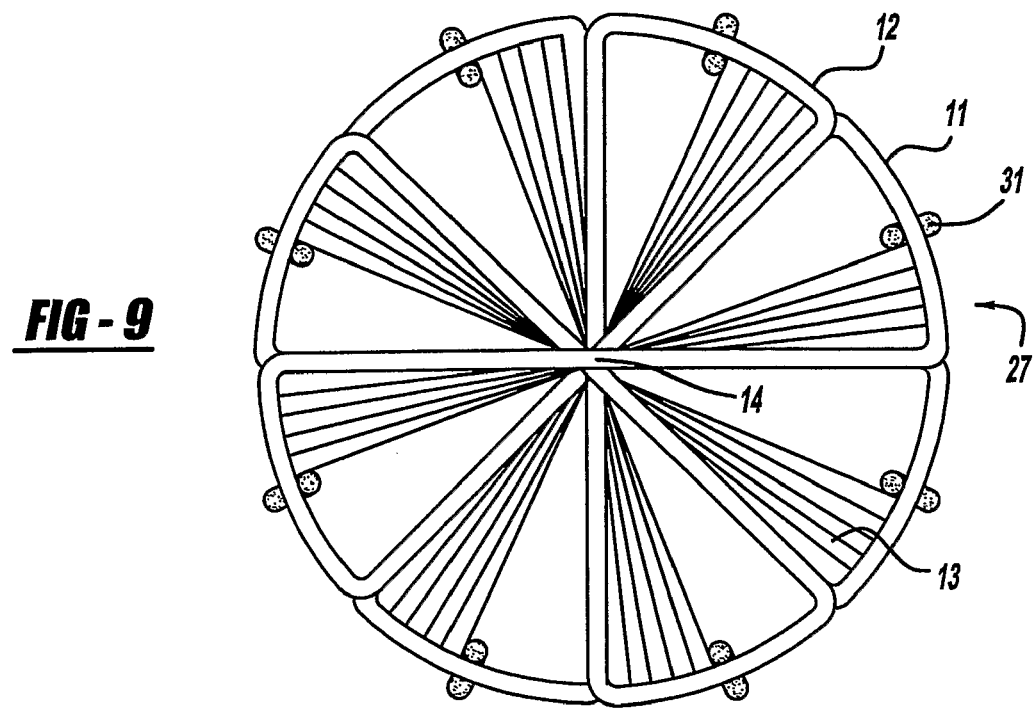
FIG. 9 is a front elevational view showing the third preferred embodiment woven impeller of FIG. 8.
Figure 20:
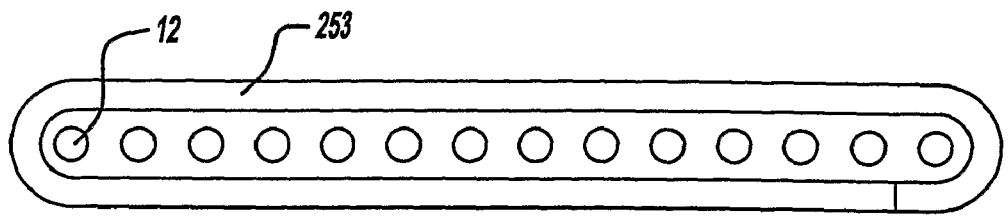
FIG. 20 is a diagrammatic, cross-sectional view showing another alternate embodiment woven impeller of the present invention.
Figure 21:
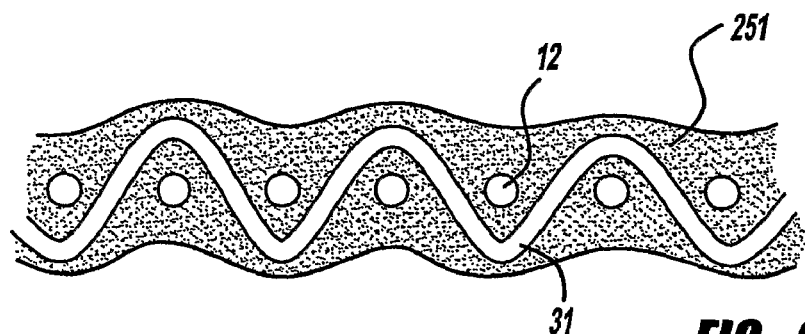
FIG. 21 is a diagrammatic, cross-sectional view of the third preferred embodiment woven impeller of FIGS. 8 and 9.

Referring to FIGS. 5 and 6, a second preferred embodiment woven impeller 15 includes a magnetic, electromagnetically energizable, or conductive fiber 16 woven into shroud 11. Fiber 16, as shown in FIGS. 5 and 6, is an individual and separate member woven or placed in alternating layers to continuous, nonconductive fiber 12. Fiber 16 is preferably an elongated and continuous fiber which is resin coated. Fiber 12 is woven such that it creates blades 13 and peripheral shroud 11. Thus, fibers 12 and 16 integrally create blades 13 and shroud 11 as a single piece. Referring to FIGS. 8, 9 and 21, an additional third preferred embodiment of impeller 27 is shown. In this embodiment, impeller 27 has multiple, shorter electromagnetic or conductive fibers 31 generally perpendicularly woven into fibers 12 of peripheral shroud 11. Impeller 27 is formed by weaving fiber 12 thereby creating blades 13, with a centerpoint 14 (coinciding with its rotational axis), and shroud 11 with engaged fibers 31 permanently integrated therein. Fibers 12 and 31 are coated with a resin 251 by wetting. An alternate embodiment is shown in FIG. 20 wherein an induction wire 253 of copper, steel, aluminum or alloys thereof, surrounds a majority or more of the stacked segment layers of nonconductive, carbon fiber 12 at multiple spaced apart locations of the shroud. A wetted resin coating binds the segments and fibers together.

A fourth preferred embodiment impeller 261 of the present invention, includes one or more continuous nonconductive fibers 263 woven to define sixteen, spaced apart and curved blades 265, flow-through passages 267 with flow dividers 269, a hub area 271 and a peripheral should 273 of circular-cylindrical shape. In a variation, the shroud can be severed, remove and discarded from the remainder of the impeller. It is desired to tightly and closely stack the fiber segments upon each other with minimal space between in order to reduce fluid flow between the layered segments. Any remaining gaps are filled in by the resin coating from the fiber wetting process. The pitch of each blade is set by slightly offsetting the angle or degree of rotation of each fiber layer segment relative to the previously placed layer segment from bottom to top.

Figure 18A:
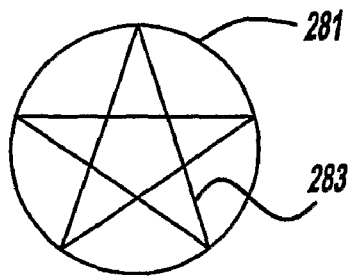
FIGS. 18a-18q, are diagrammatic top views showing alternate embodiment woven impellers of the present invention.
Figure 18B:
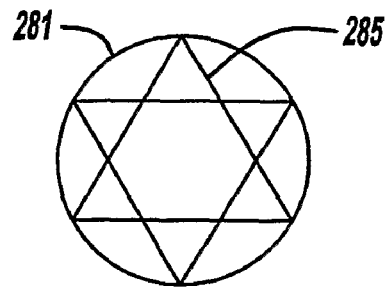
Figure 18C:
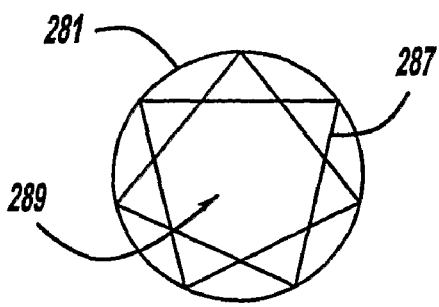
Figure 18D:
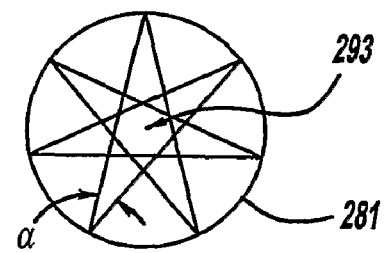
Figure 18E:
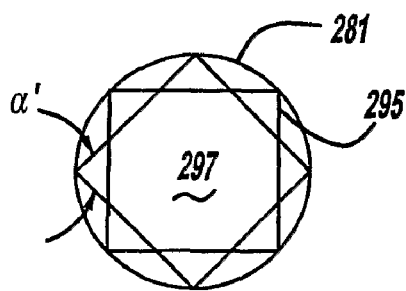
Figure 18F:
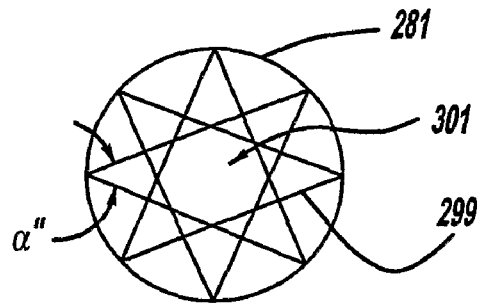
Figure 18G:
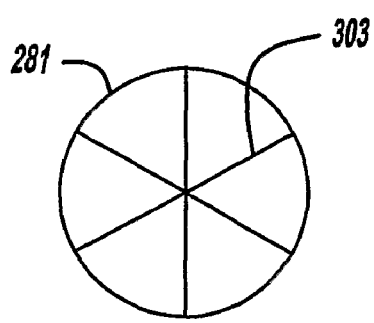
Figure 18H:
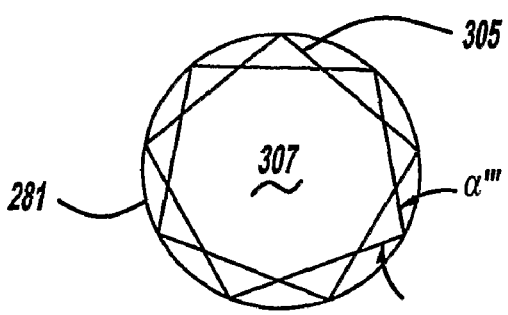
Figure 18H:
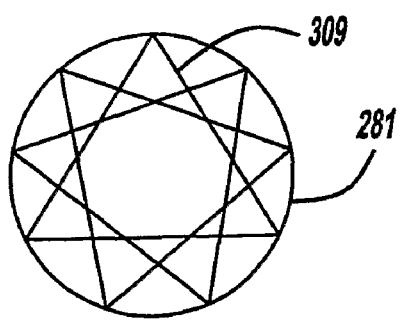
Figure 18I:
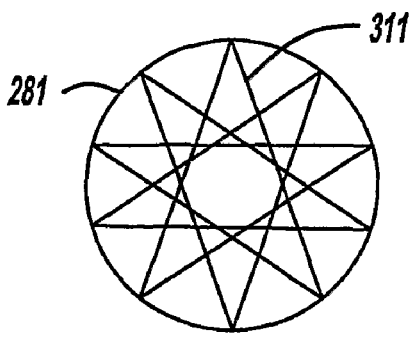
Figure 18J:
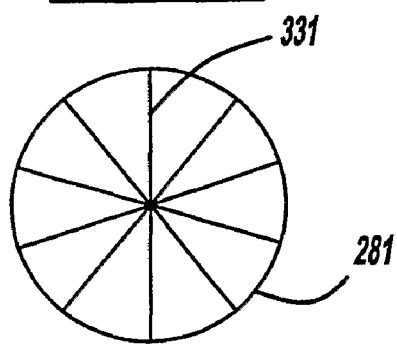
Figure 18K:
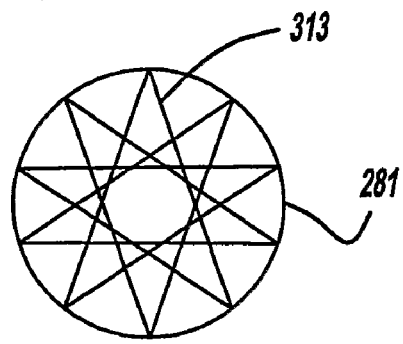
Figure 18L:
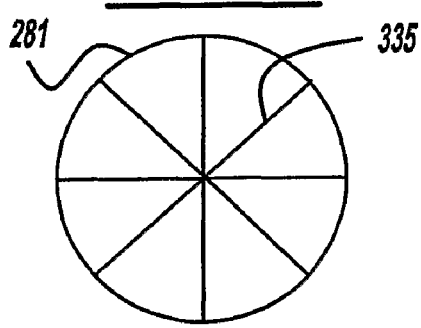
Figure 18M:
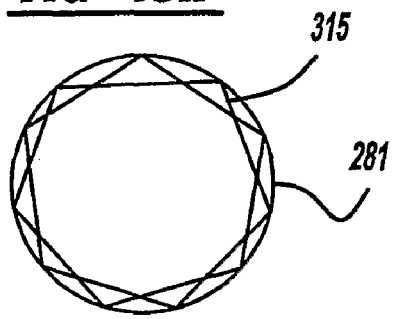
Figure 18N:
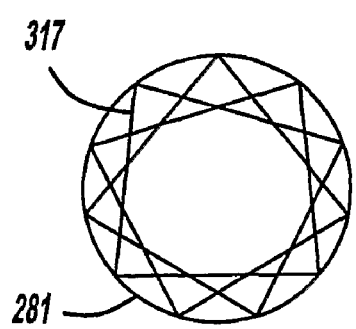
Figure 18O:
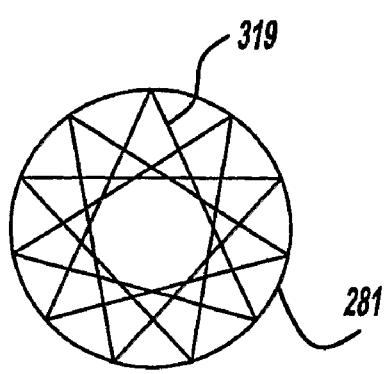
Figure 18P:
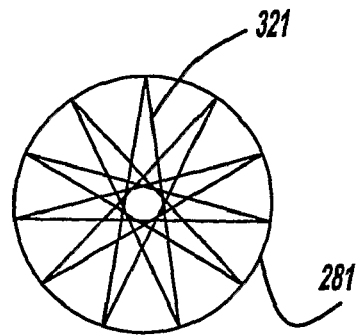
Figure 18Q:
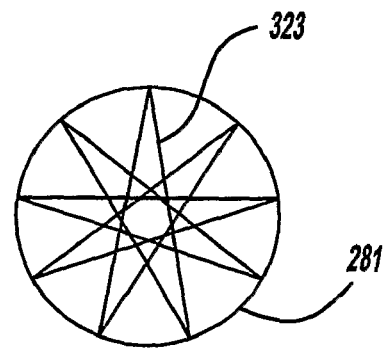

FIGS. 18a-18q, illustrate various alternate embodiment blade patterns each within a shroud 281. A five-point star pattern of blades 283 is shown in FIG. 18a, a six-point star pattern of blades 285 is shown in FIG. 18b, a seven-point star pattern of blades 287 with a large transversely spaced hub area 289 are illustrated in FIG. 18c, and a seven-point star pattern of blades 291 (of acute outer angles $\alpha$) with a small transversely spaced hub area 293 are illustrated in FIG. 18d. Furthermore, FIG. 18e, shows an eight-point star pattern of blades 295 (of about 90° outer angles $\alpha'$) with a large transversely spaced hub area 297, and FIG. 18f, illustrates an eight-point star pattern of blades 299 (of about 45° outer angles $\alpha''$) with an intermediate transversely spaced hub areas 301. A pie-shaped and centrally crossing configuration of six blades 303 can be observed in FIG. 18g, and a nine-pointed pattern of blades 305 (of obtuse outer angles $\alpha'''$) with a large transversely spaced hub area 307 is shown in FIGS. 18h. Similarly, FIGS. 18h, 18i, 18k, 18m, 18n, 180 18p, and 18q, illustrate star patterned blades 309, 311, 313, 315, 317, 319, 321 and 323, respectively, of nine, ten, ten, eleven, eleven, eleven, eleven and nine-points respectively. Variations of pie configurations of centrally crossing blades 331 and 335 are shown in FIG. 18j, and 18l, respectively, with ten and eight blades, respectively. The shrouds may remain attached to the blades as a single piece or may be cut off after manufacturing. The blades preferably have curved shapes and rotate about a central axis during operation. The shapes and patterns of these blades are significant by minimizing undesired fiber layer segment-to-adjacent segment gaps and gaps, and to minimize shroud-to-blade turn fillets (to maximize working blade surface area, while maximizing axial fluid-flow through desired impeller areas). Conductive or magnetic fibers and/or resin with such particles are optionally applied to any of these embodiments.

Advantages of a woven impeller include the ability to perform scalable, automatic, cheap rapid prototyping and/or mass production of high strength, lightweight turbomachine impellers. Other advantages include easy integration of electromagnetic motor bearing elements during the manufacturing process. In addition, active coils may be easily separated from fluid flow. In some embodiments, a drive shaft and components sealing such a shaft may be eliminated which can also lead to simplifying the dynamic system. In some embodiments, the impeller may include electromagnetic bearings or aerodynamic bearings which may be used to compensate for manufacturing imbalances. In a preferred embodiment, the woven impeller comprises a fiber that is about 3, millimeters thick. In alternate embodiments, the woven impeller is comprised of fibers that are less than one millimeter thick. In some embodiments, the woven impeller comprises a single continuous fiber and in other embodiments, the woven impeller comprises one continuous fiber and a second continuous fiber that has electromagnetic properties. The transverse impeller diameter may range from about one meter or greater to about a centimeter or less. Various applications of such an impeller include a turbomachine, turbocharger, turbochiller, a turbine, a compressor, a pump, a fan, a blower, a jet engine, or any other such application that impellers or other rotatable members are commonly used in the art.

The condensing wave rotor system of the present invention, which preferably employs a woven impeller, is hereinafter described. Mechanical refrigeration is primarily an application of thermodynamics wherein the cooling medium, or refrigerant, goes through a cycle so that it can be recovered for re-use. Commonly used basic cycles in order of importance are vapor compression, absorption, steam jet or steam injector, and air. Each cycle operates between two pressure levels, and all except the air cycle uses two phase working medium which alternates cyclically between the vapor liquid and the vapor phases.

Water as a refrigerant (R718) is very beneficial because it is natural, absolutely harmless to man and nature, easily available and there are no problems disposing it after use. Also it allows the use of high-efficient direct heat exchangers since cold water, refrigerant and cooling water all are the same fluid, mostly just water taken from the tap. As a challenge, relatively high pressure ratios are required since the cycle works under a coarse vacuum; they are approximately twice as high as pressure ratios when using classical refrigerants like R134a or R12. Combined with the thermodynamic properties of water vapor, this high pressure ratio requires approximately a two to four times higher circumferential speed of the turbocompressor impeller or wheel, which can only be achieved economically by new special high-performance turbocompressors. However, most air-conditioning applications require two, bulky and complete radial compressor stages with intercooling. The isentropic efficiencies of the turbocompressors are substantially limited by the required high pressure ratios and the efficiency of the pressure recovery of the steady-flow diffusers, which decelerate the high speed vapor flow coming from the high-speed compressor impellers. Hence, flow boundary layers cannot withstand such a high pressure rise and tend to separate more easily from the walls and vanes of such steady flow devices, thereby reducing the compressor efficiency further.

Figure 10:
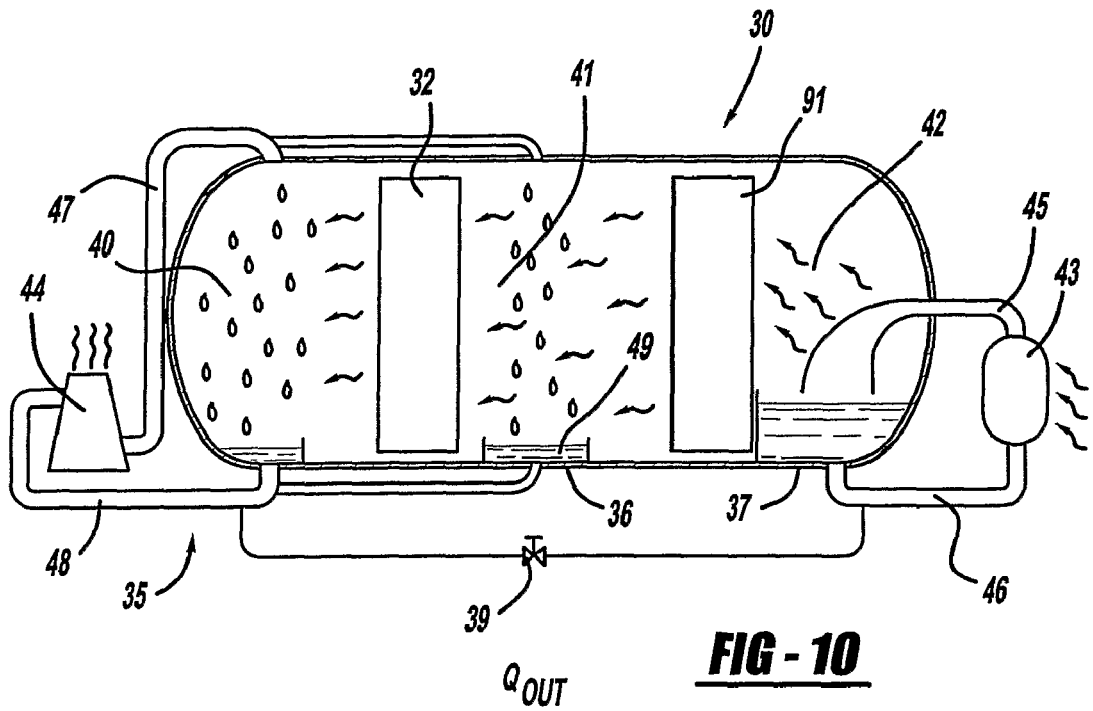
FIG. 10 is a diagrammatic side view showing a generic embodiment of the present invention.

The key component of a R718, turbochiller is the compressor. Water as the refrigerant has some specific features that complicate this application in refrigeration plants with turbocompressors. Since the cycle works under course vacuum, volumetric cooling capacity of water vapor is very low and hence huge volume flows have to be compressed with relatively high pressure ratios. As compared with classic refrigerants like R134a or R12, the use of water (R718) as a refrigerant requires approximately 200, times higher volume flow and about double the pressure ratio for the same applications. Due to thermodynamic properties of water vapor, this high pressure ratio requires approximately a 2, to 4, times higher compressor tip speed, depending on impeller design, while the speed of sound is approximately 2.5, times higher by way of comparison. Reynolds numbers are about 300, times lower and the specific work transmission per unit mass has to be about 15, times higher. One way to solve this traditional problem is shown in FIG. 10. A generic turbochiller 30 has a chilled water cycle 37, a first compressor 91, a refrigerant cycle 36, a second compressor 32, and a cooling water cycle 35. Cooling water cycle 35 and chilled water cycle 37 are connected via expansion valve 39. Referring to chilled water cycle 37, a heat source 43 heats water which flows through stream 45 into an evaporator 42. Evaporated water then enters first compressor 91. Water that is not forced through the compressor is collected and cycled through pipe 46 back to the heat source. After the evaporated water enters first compressor 91, it is compressed and is refrigerated through an intercooler area 41 which then is forced into second compressor 32 in compressor condenser area 40. Water vapor that condenses in intercooler region 41 is collected into a collection area that is connected to cooler water cycle collection area 49. An exemplary water refrigeration system is disclosed in U.S. Pat. No. 6,427,453, entitled "Vapor-Compression Evaporative Air Conditioning Systems and Components" which issued to Holtzapple et al. on Aug. 6, 2002, which is incorporated by reference herein. Any of the previously disclosed woven impellers of the present invention may be employed by the compressors 91 and/or 32 in turbochiller 30, even without a wave rotor.

A wave rotor offers great potential and advantages for a condensing wave rotor system of the present invention in a refrigeration system, since it exploits the enormous density differences of gaseous and liquid fluid by the action of centrifugal forces. This greatly supports the separation of vapor and condensed fluid in the scavenging process and channel drying before refilling, which addresses a concern in handling of phase changes occurring in both directions in axial wave rotors.

Utilizing time-depended flow features, wave rotors represent a promising technology for increasing the overall pressure ratio and the efficiency of the pressure recovery. As discussed above, for the same inlet and outlet Mach numbers, the pressure gain in time-dependent flow devices can be much higher than that obtained in steady flow devices. This also may allow for a lower total pressure ratio of the compressor impeller, which is usually associated with a higher isentropic efficiency of the compressor impeller assuming its aerodynamic quality stays the same (e.g., the same polytropic efficiency). This increases the overall efficiency. Furthermore, the combination of this may then also permit the use of more compact novel axial compressors with less stages and will further promote the new environmental friendly and energy efficient R718-technology for refrigeration, air-conditioning and heat pump applications of capacities <500, kW, which is hardly available today in form of an economical solution.

A wave rotor is a device that utilizes unsteady wave motion to exchange energy by direct work action between fluids. A wave rotor consists of an array of channels on the periphery of a rotor. As the wave rotor rotates, the ends of the channels are periodically ported to high and low pressure manifolds or ducts which generate and utilize waves in the channels. These pressure exchanging wave rotors are typically used as a topping unit to enhance the performance of a gas turbine engine. As a topping cycle in a gas turbine engine, the air from the engine compressor is directed into the wave rotor through a first port. The air flows into the channels of the rotor and is compressed by a series of compression or shock waves. This air leaves the wave rotor through a second port at a higher pressure than when it entered the wave rotor, and passes to a burner or combustor. After being heated in the burner, the gas returns to the wave rotor through a third port, driving a shock into the air residing in the channels. This gas is trapped within the channels as the third port closes at a high pressure. When the wave rotor rotates around to a fourth port, the gas expands out into the relatively lower static pressure in the fourth port and flows to the high-pressure engine turbine. In passing through the wave rotor, the air is first compressed and then expanded, thus, the wave rotor combines in a single device the functions performed by the compressor and turbine in a high spool. By using a wave rotor topping cycle, combustion temperatures greater than the turbine inlet temperature can be used since the gas leaving the combustor is cooled in expansion before being sent to the turbine. Also, since the rotor is washed alternately by cool inlet air and hot combustion gas, it is self-cooled and obtains a steady state temperature significantly lower than the combustion temperature.

The basic concept underlying wave rotors is the transfer of energy between different fluids with shock and expansion waves. By generating compression and expansion waves in appropriate geometries, wave machines can transfer the energy directly between fluids without using mechanical components such as pistons or vaned impellers. For example, reference should be made to: U.S. Pat. No. 5,297,384, to Paxson issued Mar. 29, 1994;, U.S. Pat. No. 5,267,432, to Paxson issued Dec. 7, 1993;, U.S. Pat. No. 5,894,719, to Nalim et al. issued Apr. 20, 1999;, U.S. Pat. No. 5,916,125, to Snyder issued Jun. 29, 1999;, U.S. Pat. No. 6,351,934, to Snyder issued Mar. 5, 2002;, U.S. Pat. No. 6,449,939, to Snyder issued Sep. 17, 2002;, U.S. Pat. No. 6,526,936, to Nalim issued Mar. 4, 2003;, all of which are incorporated by reference herein.

There are several important advantages of wave rotor machines. Their rotational speed is low compared with conventional turbomachines, which results in low material stresses. From a mechanical point of view, their geometries can be simpler than those of conventional turbomachines. Therefore, they can be manufactured relatively inexpensive. Also, the rotor channels are less prone to erosion damage than the blades of conventional turbomachines. This is mainly due to the lower velocity of the working fluid in the channels, which is about one-third of what is typical within conventional turbomachines. Another important advantage of wave rotors is their self-cooling capabilities. They are naturally cooled by the fresh cold fluid ingested by the rotor. Therefore, applied to a heat engine, the rotor channels pass through both cool air and hot gas flow in the cycle at least once per rotor revolution. As a result, the rotor material temperature is always maintained between the temperature of the cool air, which is being compressed and the hot gas, which is being expanded.

The phase change of the fluid inside the wave rotor in a R718, refrigeration application is a major difference to the operation of a wave rotor in a traditional gas turbine cycle. Additionally, here the low pressure fluid is at higher temperature than the high pressure fluid. Coming from the compressor impeller at high-speed, the water vapor flows through a vapor collector that guides it to the inlet port at an end plate of the wave rotor. When a channel is opened by the interplay of end plate and the rotating rotor, the vapor flows into the channel. Then, if the high pressure cooling water is introduced from the opposite side, it may be injected dynamically short before the vapor inlet port is closed—meaning before the compression shock wave propagating into the vapor faster than the phase interface reaches the trailing edge of the vapor inlet port. To assist uniform inflow of the high pressure cooling water, the rotor axis may be vertical and the water may be injected from the bottom. After the vapor is pre-compressed by a primary shock wave and halted, the incoming water may compress the vapor further and fully condense it, depending on what kind of wave rotor has been chosen. A pump supplies the high pressure to the cooling liquid. Its energy consumption might be considered negligible, since the liquid is incompressible. The fluid now in its liquid state serves as a "work capacitor" storing the pump work to release it for the vapors compression during its expansion in the wave rotor channels.

Gravity and pump power may also assist the scavenging and charging of the channels. In advanced configurations, the channels may be curved or bent for reasons like supporting or maintaining the rotation of the rotor more efficiently like the "free running rotor" mentioned above. Due to the unsteady nature of the device, each channel of the wave rotor is periodically exposed to both hot and cold flow. This can be timed in a way that the channel wall temperature stays approximately at the same temperature like the incoming cooling fluid, supporting desuperheating and condensation of the vapor.

Figure 11:
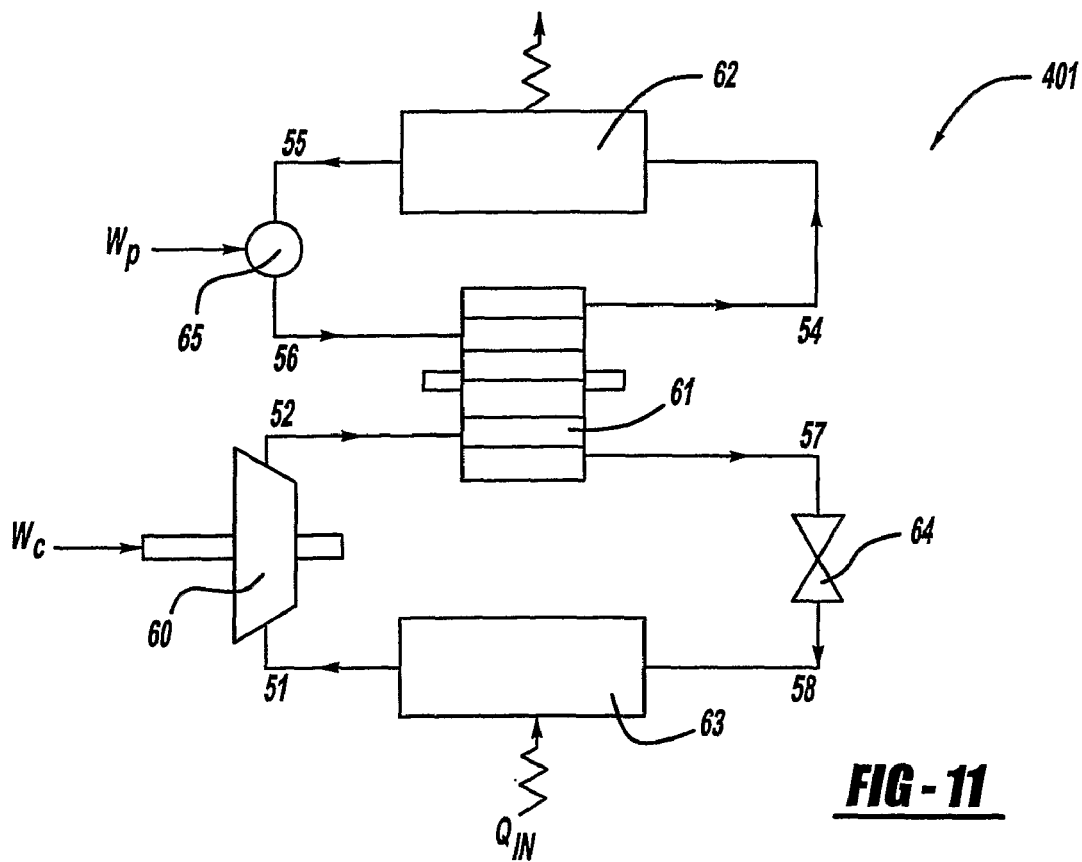
FIG. 11 is a block diagram showing an alternate, four port wave rotor system employed with a condensing wave rotor system of the present invention.

Two ways of implementing a wave rotor of a condensing wave rotor system 401 of the present invention into an R718, cycle are described below. As shown in FIG. 11, the first implements a 4-port wave rotor working more similar to a gas-turbine-topping wave rotor. This still requires an external condenser. The second and preferred implementation, as shown in FIG. 12, employs a 3-port condensing wave rotor that eliminates the need of an external condenser, since full condensation occurs inside the wave rotor.

The wave rotor is embedded between the compressor and expansion valve parallel to the condenser. FIG. 11 illustrates how this wave rotor 61 is used to top a R718, refrigeration cycle. In the wave rotor channels, the high-pressure cooling water leaves through a conduit 56. A pump 65 compresses superheated vapor 52 coming out of a compressor 60. Then the additional compressed vapor 54 travels from wave rotor 61 to a condenser 62 where it condenses while rejecting heat to the environment and returns through a conduit 55 to wave rotor 61 after a pressure boost by pump 65. During the vapor compression in wave rotor 61, the water pre-expands at 57 and is then further expanded at 58 into the 2-phase region by expansion valve 64. After full evaporation, while picking up the heat in evaporator 63, refrigerant vapor flowing through conduit 51 is pre-compressed in compressor 60 and the cycle continues as described above. In this configuration, the phase change mainly happens outside wave rotor 61. Therefore, the vapor mass flows in and out of the wave rotor are nearly equal. The same is true for the mass flows of the water in and out of the wave rotor. However, the water ports are much smaller than the vapor port. The advantage of using a wave rotor in this configuration can be realized by comparing the thermodynamics cycles of the baseline and the wave-rotor-enhanced cycle. Due to the additional compression by the wave rotor, condensation happens at a higher temperature without increasing the pressure ratio of the compressor. It first and importantly enables the system to work with a higher temperature difference and secondly results in a similarly high coefficient of performance ("COP") like the baseline cycle has for a smaller temperature difference.

Figure 12:
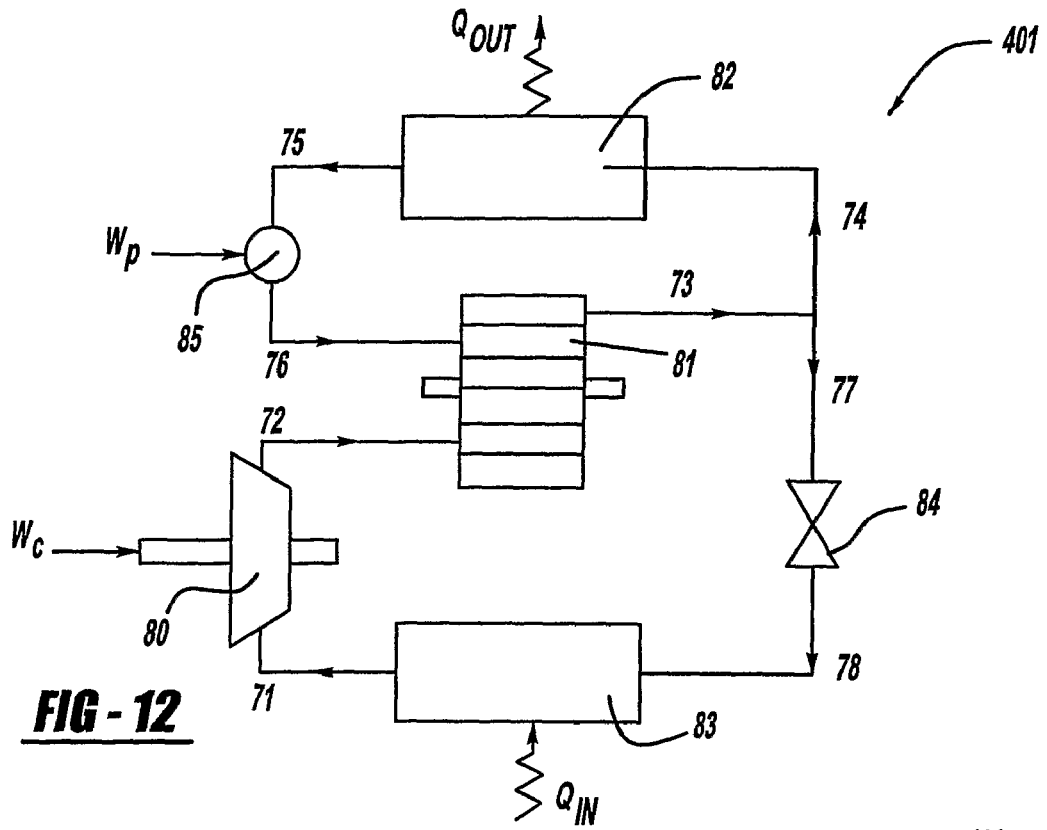
FIG. 12 is a block diagram showing a preferred, three port wave rotor system employed with a condensing wave rotor system of the present invention.

FIG. 12 shows the cycle arrangement with a condensing wave rotor in a three port configuration. Concerning the pressure levels, its function is similar to a pressure-equalizer taking high 76 and low pressure 72 streams and equalizes them to a single "medium" pressure stream 73. However, a condensing wave rotor 81 employs a high-pressure 71, low-temperature liquid 72 to compress and condense a low-pressure high-temperature gas 73. Thus, in the wave rotor channels, high-pressure low-temperature water 76 coming out of a pump 85 compresses superheated vapor 72 coming out of a compressor 80, desuperheats and fully condenses it. At the beginning of the process, when the high-pressure low-temperature water 76 is exposed to the low-pressure high-temperature vapor 72, due to sudden pressure drop, all the heat cannot be contained in the water and the heat surplus transforms into latent heat of vaporization. It is the so called flash evaporation or flashing phenomenon, resulting in a temperature drop of the water. Therefore, a portion of water suddenly vaporizes which causes a shock wave that travels through the superheated low pressure vapor existing inside the channel. After the shock wave has additionally pressurized the vapor inside the channel, incoming water compresses the vapor further while desuperheating it. When the vapor pressure has reached saturation pressure, the continuing compression by the incoming water causes phase change (condensation) of the vapor to water while further transfer of (now latent) heat to the incoming water occurs.

At the only outlet port 73 of wave rotor 81, water is scavenged and then separated into two streams 74, 75. One goes to an expansion valve 84 and the other to a heat exchanger 82, where the heat is ejected to the environment. A pump 85 provides the pressure level needed at a high pressure inlet 76 of wave rotor 81. After full evaporation, while picking up the heat in an evaporator 83, refrigerant vapor 71 is recompressed in compressor 80 and the cycle continues as described above.

Figure 13:
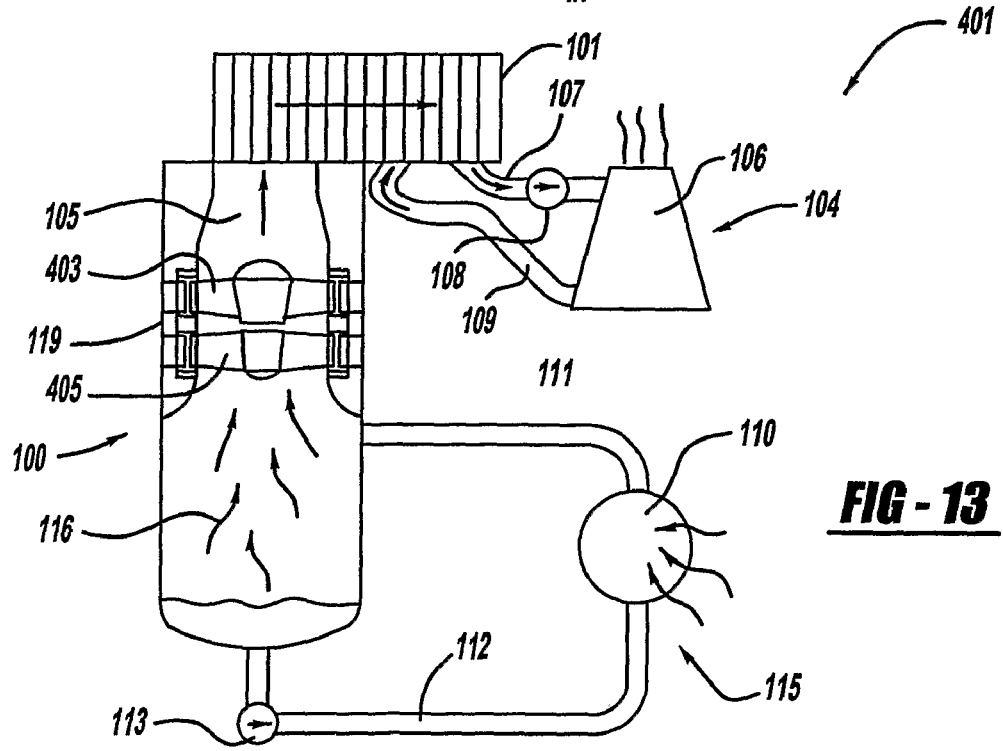
FIG. 13 is a diagrammatic side view showing a first preferred embodiment of the condensing wave rotor system of the present invention, illustrating a woven wave rotor impeller.

Various embodiments of the use of a wave rotor as part of a turbochiller, condensing wave rotor system 401 of the present invention are illustrated in FIGS. 13, 14, 15 and 16. The turbochiller systems vary in size and various preferred embodiments are about one meter or less in diameter. Referring to FIG. 13, a chilling system 100 has a chilled water cycle 115, a refrigeration cycle 119 and a cooling water cycle 104. Chilled water cycle 115 includes heat source 110, which directs heated water 111 to evaporator 116. In some embodiments the heated water 111 enters the evaporator 116 as a jet stream. Water not in a vapor state is collected at the bottom of 116 and is pumped 113 via stream 112 back to heat source 110. Refrigeration cycle 119 includes at least one compressor impeller and, in some embodiments, may include two compressor impellers 403 and 405. In such compression systems, a woven impeller discussed above may be utilized. Condenser 105 is connected to a three port wave rotor 101 which is in fluid communication with heat ejection 106 and is connected through stream 107 and pump 108 to heat rejection 106 and the cooled water re-enters wave rotor 101 through stream 109.

Figure 14:
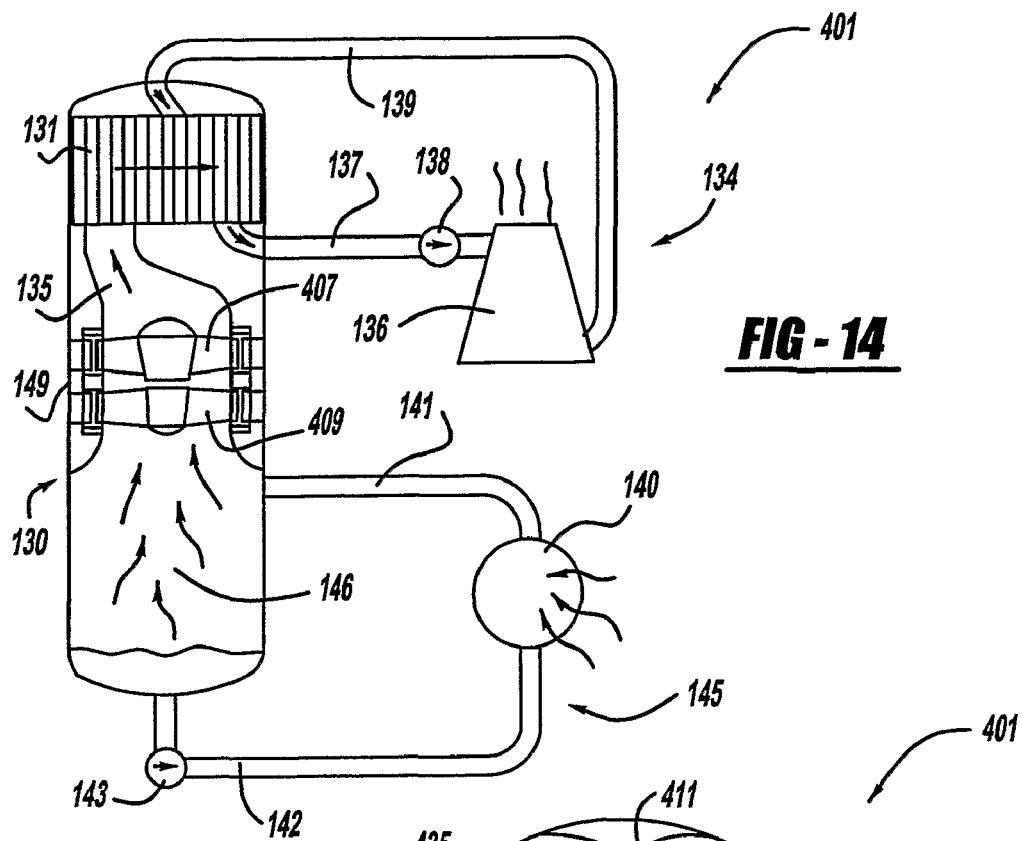
FIG. 14 is a diagrammatic side view showing a second preferred embodiment of the condensing wave rotor system of the present invention, illustrating a woven wave rotor impeller.

Referring to FIG. 14, a chilling system 130 has a chilled water cycle 145, a refrigeration cycle 149 and a cooling water cycle 134. Chilled water cycle 145 includes heat source 140, which directs heated water 141 to evaporator 146. In some embodiments, the heated water 141 enters evaporator 146 through water nozzles, misters, atomizers or jets and in these embodiments the evaporator 146 may include multi contact body cages which enhance droplet separation by gravity. Water not in a vapor state is collected at the bottom of 146 and is pumped 143 via stream 142 back to heat source 140. Refrigeration cycle 149 includes at least one compressor impeller and, in some embodiments, includes two compressor impellers 407 and 409. In such compression systems, a woven impeller discussed above may be utilized. Condenser 135 is connected to a three port wave rotor 141 which is in fluid communication with heat rejection 136 and is connected through stream 137 and pump 138 to heat ejection 136 and the cooled water re-enters wave rotor 131 through stream 139. In this version, the wave rotor is internal to and adjacent an end of the chilling system housing as compared to the external mounting in the prior embodiment.

Figure 15:
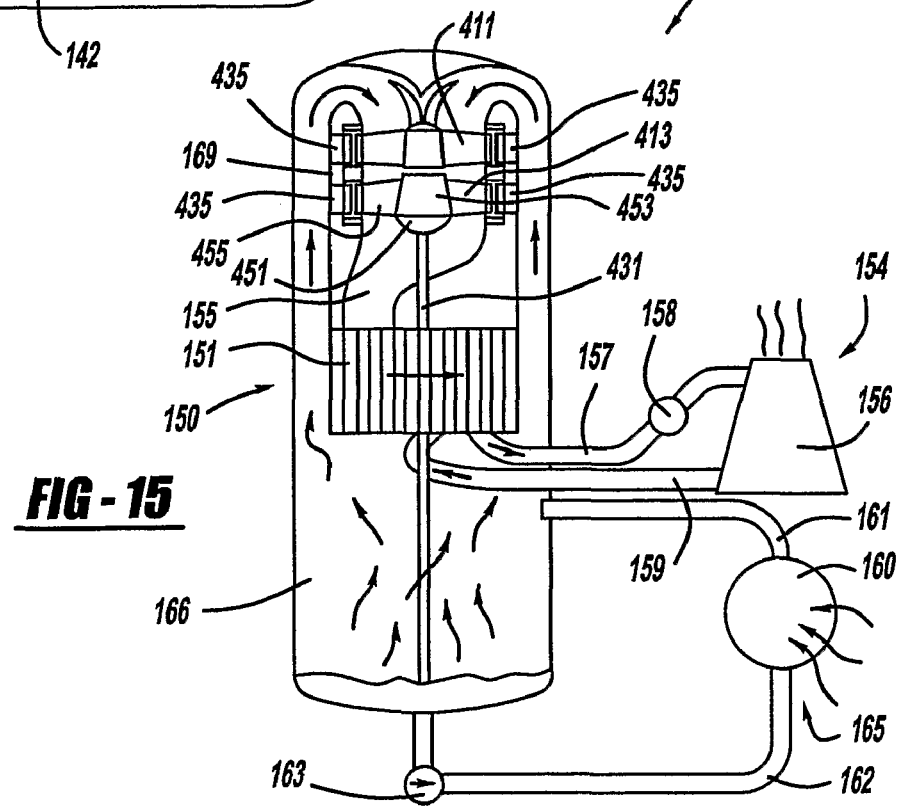
FIG. 15 is a diagrammatic side view showing a third preferred embodiment of the condensing wave rotor system of the present invention, illustrating a woven wave rotor impeller.

Referring to FIG. 15, a chilling system 150 has a chilled water cycle 165, a refrigeration cycle 169 and a cooling water cycle 154. Chilled water cycle 165 includes heat source 160, which directs heated water 161 to evaporator 166. In some embodiments, evaporator 166 includes a multi buckets evaporator system and such system may enhance gravity droplet separation. Water not in a vapor state is collected at the bottom of 166 and is pumped 163 via stream 162 back to heat source 160. Refrigeration cycle 169 includes at least one compressor impeller and, in some embodiments, may include two compressor impellers 411 and 413. In such compression systems, a woven impeller discussed above may be utilized. Condenser 155 is connected to a three port wave rotor 151 which is in fluid communication with heat ejection 156 and is connected through stream 157 and pump 158 to heat ejection 156 and the cooled water re-enters wave rotor 151 through stream 159. The wave rotor is centrally mounted with the housing in this embodiment.

Figure 16:
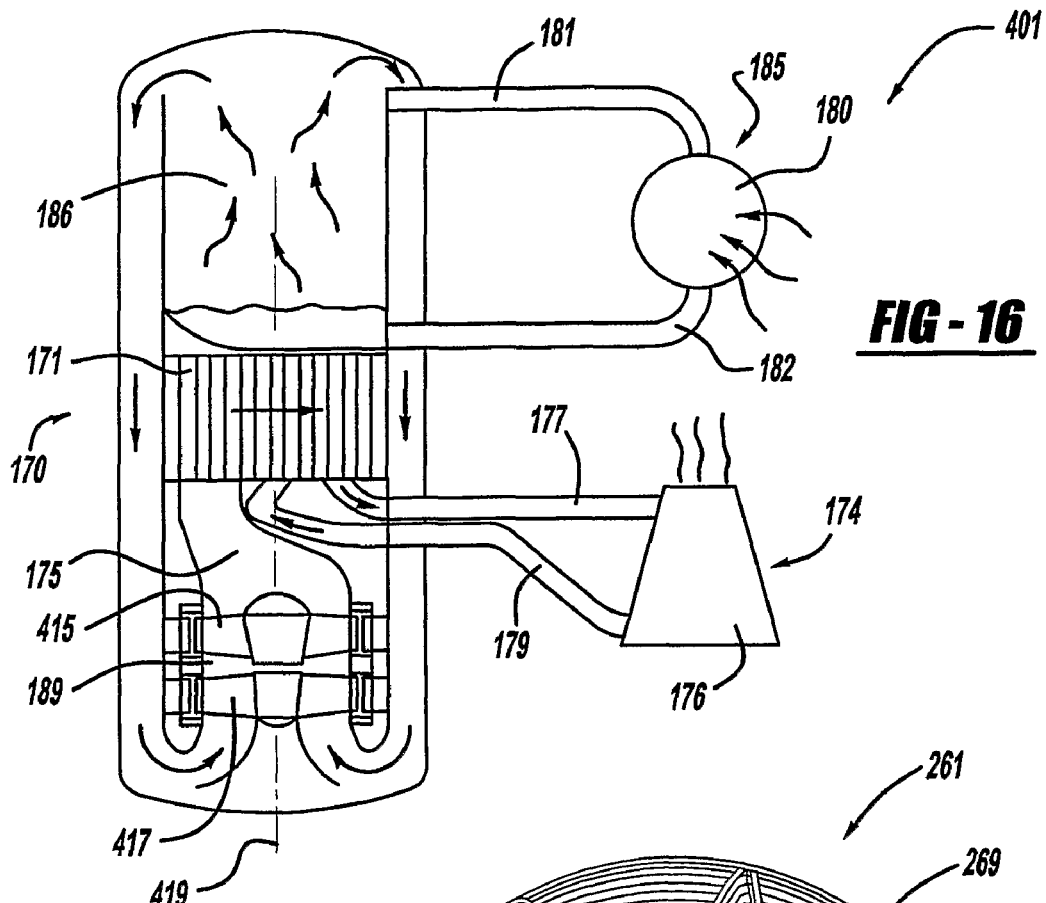
FIG. 16 is a diagrammatic side view showing a fourth preferred embodiment of the condensing wave rotor system of the present invention, illustrating a woven wave rotor impeller.
Figure 17:
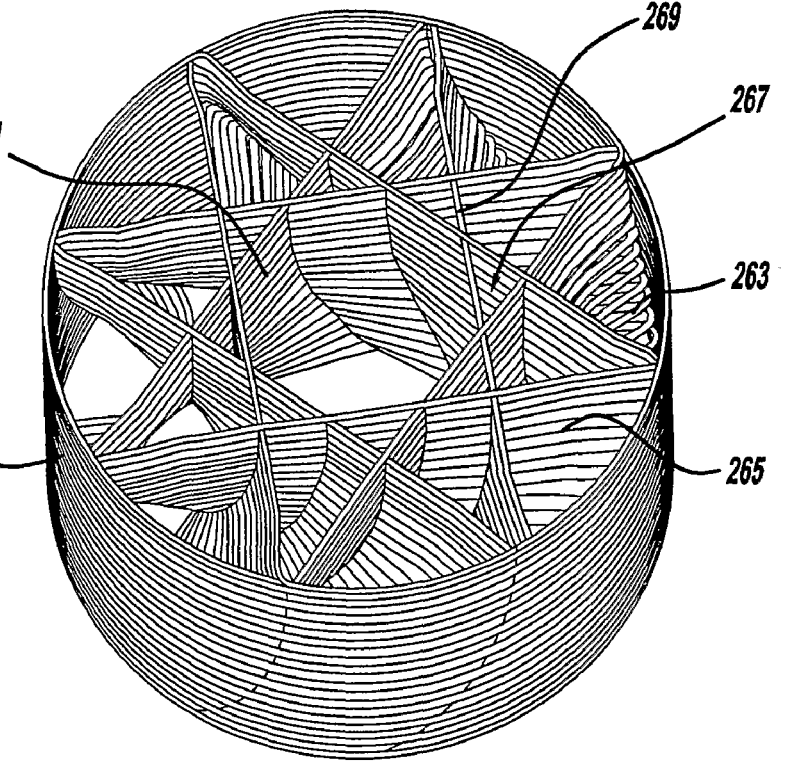
FIG. 17 is a perspective view showing a fourth preferred embodiment of a woven impeller of the present invention.

Referring to FIG. 16, a chilling system 170 has a chilled water cycle 185, a refrigeration cycle 189 and a cooling water cycle 174. Chilled water cycle 185 includes heat source 180, which directs heated water 181 to evaporator 186. In some embodiments, the heated water 141 enters evaporator 186 through water nozzles, misters, atomizers or jets and in these embodiments the evaporator 186 may include multi contact body cages which enhance droplet separation by gravity. In other embodiments, evaporator 186 includes a multi buckets evaporator system and such system may enhance gravity droplet separation. Water not in a vapor state is collected at the bottom of 186 and is pumped 183 via stream 182 back to heat source 180. Refrigeration cycle 189 includes at least one compressor impeller and, in some embodiments, may include two compressor impellers 415 and 417. In such compression systems, a woven impeller discussed above may be utilized. Condenser 175 is connected to a three port wave rotor 171 which is in fluid communication with heat ejection 176 and is connected through stream 177 and pump 178 to heat ejection 176 and the cooled water re-enters wave rotor 171 through stream 179. The wave rotor is also central located inside the housing for this embodiment. The rotational axis 419 of the wave rotor is coaxially aligned with that of the compressor impellers.

Figure 19:
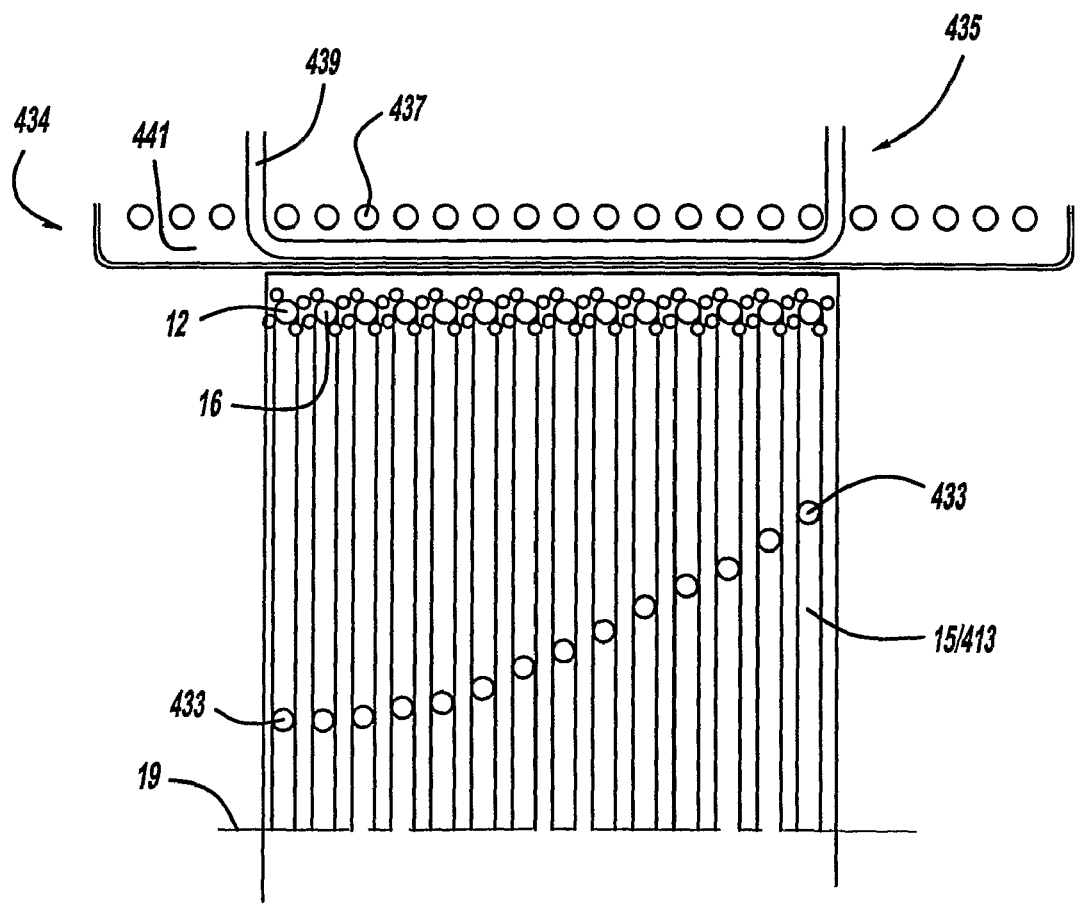
FIG. 19 is a diagrammatic, cross-sectional view showing another alternate embodiment woven impeller of the present invention, employed with an electric motor of the condensing wave rotor system.

The compressor area of the condensing wave rotor system 401, exemplified by the embodiment of FIG. 15, is further described as follows. Exemplary compressor impeller 413 is of the woven type shown in FIGS. 5 and 19, having non-conductive fibers 12 alternating with magnetic fibers 16. Impeller 413 includes a shroud and blades which operably rotate about a rotational centerline 19. A drive shaft 431 (see FIG. 15) mechanically connects a hub of impeller 413 to wave rotor 151 along centerline 19. An alternate inner contour of the hub may be arcuate as is shown by fiber ends 433, for example with impeller 411. Alternately, conductive fibers 16 can be replaced by metallic particles in the resin, preferably only at the shroud portion, with no conductive material at the blade portions, to reduce weight. Impeller 413 acts as a rotating rotor in an electric motor 434 of the present invention system.

A stationary stator 435 of electric motor 434 includes resin coated, carbon fibers 437 or the like, which are tightly stacked together. Copper induction wires 439 are wound around the spool of structural fibers 437 and attached together by a curing resin matrix material 441. The resin and wires serve as a radial bearing for the impeller. A small axial gap is present between the outer periphery of the impeller and the inner surface of the stator. Thus, electric energization of the stator's induction wires 439 causes magnetic fibers or wires 16 of impeller 413 to levitate impeller 413 in the center of stator 435 while rotating the impeller within the stationary stator. Of course, the energization and permanent magnetism can be reversed between the impeller and stator if desired.

Furthermore, a hub 453 includes a curved and leading end surface 451 and a tapered, substantially frusto-conical side surface mounted within each impeller 411 and 413. These surfaces of hub 453 improve fluid flow characteristics through each impeller, especially when both are coaxially aligned as shown in FIG. 15. Furthermore, the electric motor aspects are essentially outside of the fluid stream, thereby improving fluid flow properties of the system.

Figure 22:
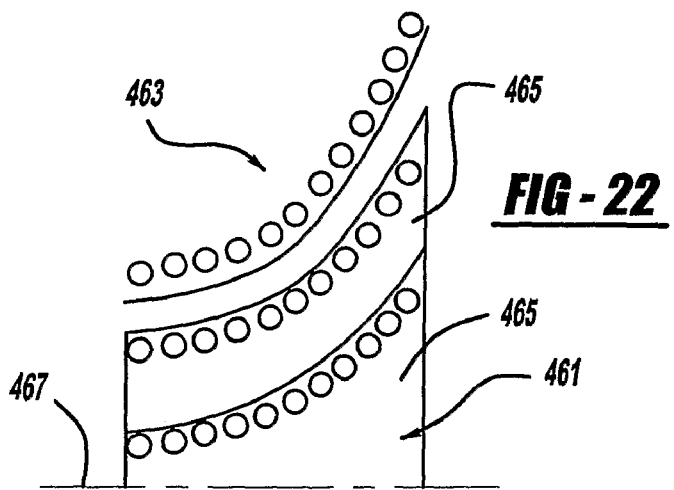
FIG. 22 is a diagrammatic cross-sectional view showing a further alternate embodiment woven impeller of the present invention, employed with an electric motor of the condensing wave rotor system.
Figure 23:
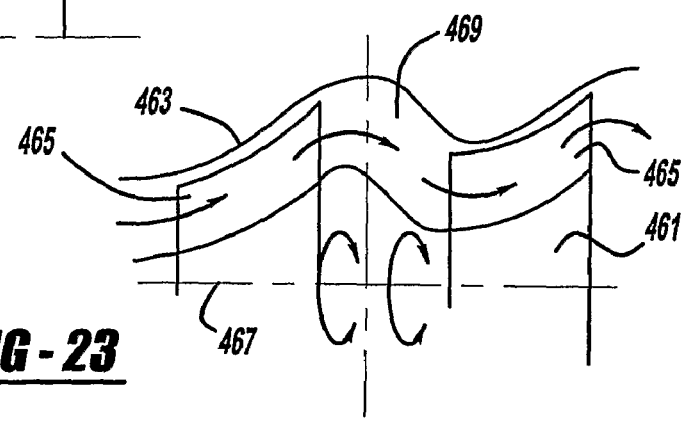

Alternate impeller 461 and stator 463 shapes are shown in FIG. 22, where there are matching concave and convex (or diagonal) adjacent surfaces. This works best with no shroud on the final impeller blades 465. When two or more of such impellers are rotated about their coaxial axis 467, the fluid flows through the circumferential gap 469 and is compressed by blades 465, as is illustrated in the variations of FIGS. 23 and 24.

Figure 28:
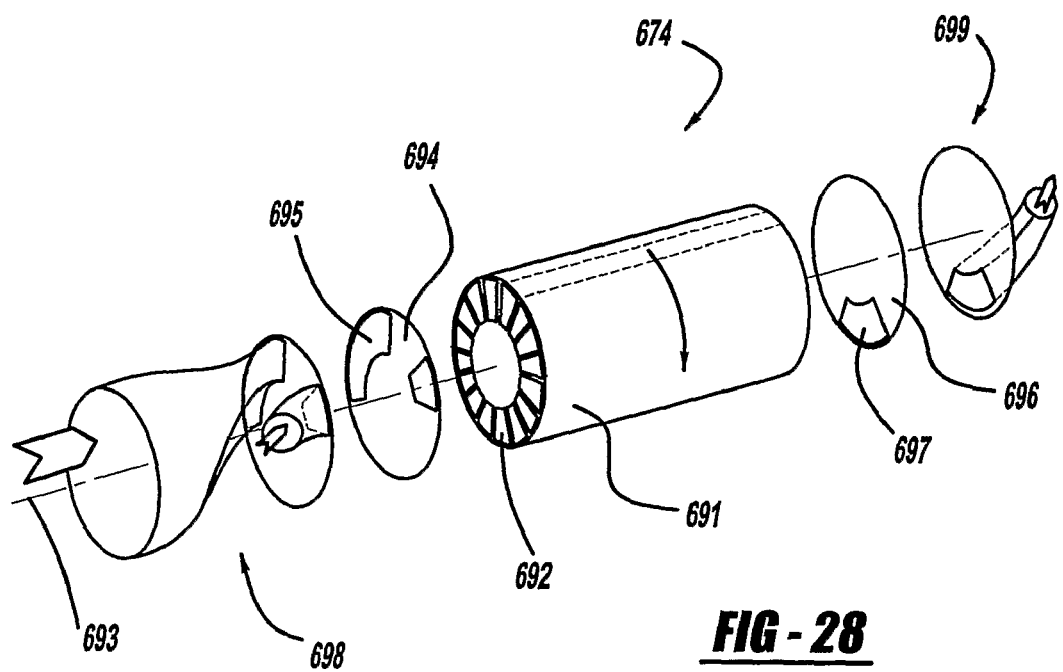
FIG. 28 is a diagrammatic view showing another preferred embodiment condensing wave rotor system of the present invention.
Figure 29:
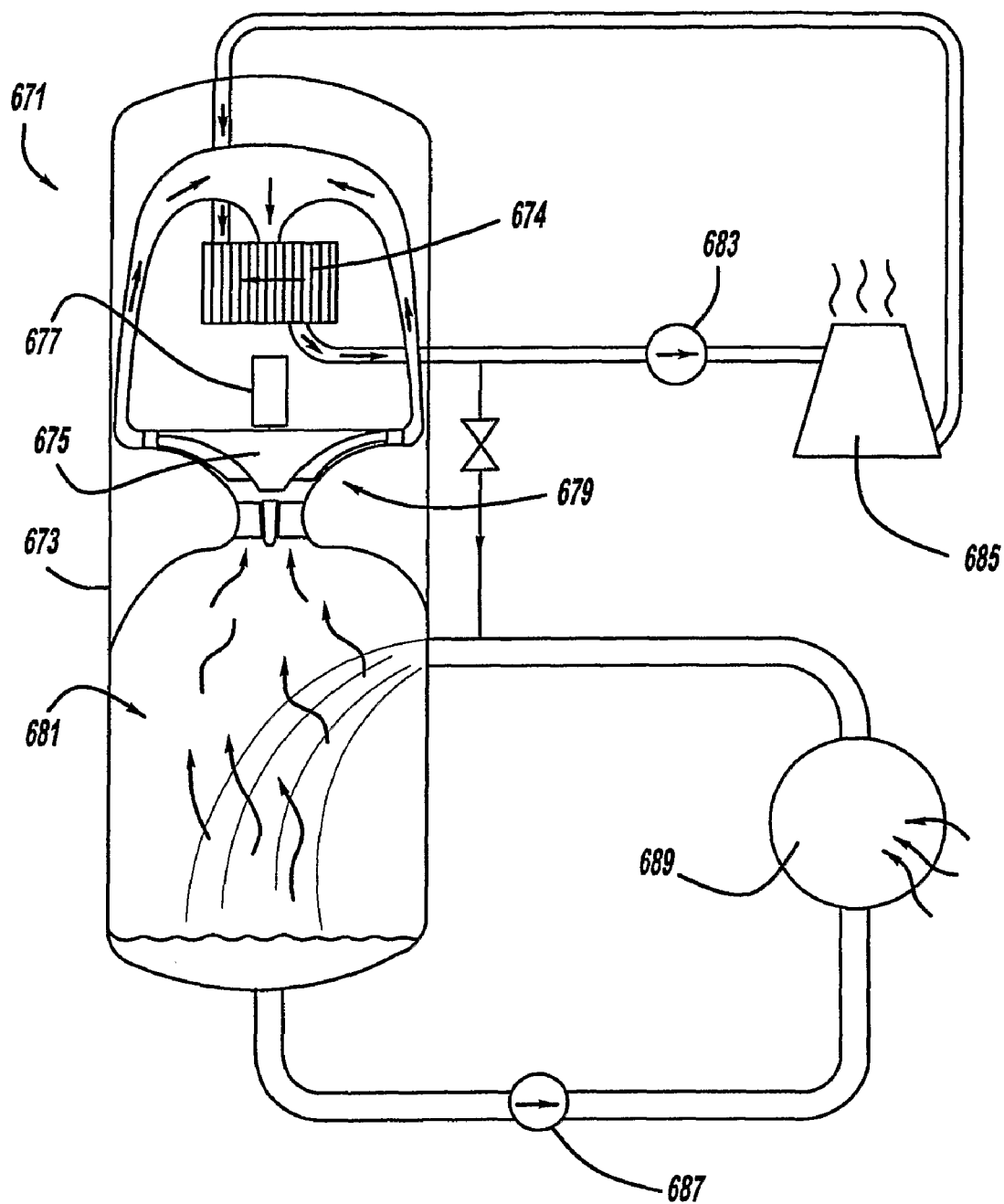
FIG. 29 is an exploded, perspective view showing an axial wave rotor employed in all of the preferred condensing wave rotor systems disclosed herein.

An additional preferred wave rotor system 671 can be observed in FIGS. 28 and 29. System 671 includes a tank-like housing 673 having a length of less than about 5, meters, and preferably at or less than 4.7, meters, with an outer diameter width of less than or about 2, meters. The length of the present invention is about half that of prior water-based turbochillers. System 671 further includes an axial (or alternately, radial) condensing wave rotor 674, a woven fiber (or alternately, cast metal or molded polymer) impeller 675 in a compressor 679, a water evaporator 681, a first pump 683, a cooling tower 685, a second pump 687 and a heat source/exchanger 689.

The preferred axial wave rotor is illustrated in FIG. 29. Wave rotor 674 includes a circular-cylindrical, outer drum 691 containing multiple channels 692 elongated parallel to a rotational axis 693. Stationary end plates 694 and 696 contain ports 695 and 697, respectively, that selectively align with some of channels 692 during rotation of wave rotor drum 691 and channels 692. Low pressure water vapor enters a vapor collector 698 and the enlarged port in end plate 694, while high pressure water enters the smaller port in end plate 694. Furthermore, medium pressure water 699 exists port 697 in end plate 696.

A multi-stage, axial, counter-rotating turbocompressor with a woven composite impeller is desirable. For example, the counter rotation advantageously allows for no swirl before and after the impeller stage, which is different from conventional single impeller stages. Furthermore, guide vanes can be eliminated which reduces size, cost and efficiency losses. Moreover, no fixed guide vanes broaden the operating range and the invention can achieve a significantly higher pressure ratio in a single stage. Axial compressors, have much smaller diameters than traditional radial or mixed-flow compressors for the same capacity, such that the radius of the present invention can be reduced to 25% than that of traditional compressors. Since the volume reduces with the square of the radius, the volume can be about 10 times less than conventional systems and the related unit cost is reduced with the volume. Multi-stage compressors are also advantageous by achieving additional pressure ratios with minimal space. Furthermore, it is alternately envisioned that the condenser and compressor of FIG. 19 may be vertically arranged in an upright orientation to advantageously save floor space (see for example, FIG. 29). Other variations include: (a) a multi-bucket evaporator having gravity droplet separation at the bottom of the housing with water jet nozzles, in an internal shell, in a middle section between two oppositely rotating impellers at the top and the evaporator at the bottom, with a curved vapor path to enhance droplet separation at the top opening, between the shell and housing (similar to FIG. 15 but without the wave rotor); (b) multiple, parallel and elongated contact body cages for gravity droplet separation at the bottom, water nozzle jets immediately above the cages, a pair of oppositely rotating impellers at the middle of the housing, with straight upward vapor flow above and below the impellers and a wave rotor at the top (similar to FIG. 14); or (c)

employing multi-bucket evaporators in any of the other embodiments previously disclosed herein optionally with a high suction head for the evaporator and condenser pumps.

The woven composite impellers of the present invention are advantageous in chillers and other compressor systems. The majority of forces seen by conventional impellers are not from the gas passing through the blades but from forces acting in its radial direction due to its own inherent mass rotating at high speeds. Thus, a lightweight and strong impeller overcomes this disadvantage. The lightweight nature of the present invention impellers reduce safety issues arising from using heavy materials and reduces the forces inflicted on the impeller bearings. The present invention lightweight materials also reduce the need for extensive balancing. While the preferred fiber materials have been disclosed for the impeller, it is alternately envisioned that a biodegradable impeller can be created from a biomass matrix such as a soy bean polymer, flax or cotton fiber, for use in some applications.

While many embodiments of woven impellers and condensing wave rotor systems have been disclosed, other variations fall within the present invention. For example, one or more continuous and elongated strands or filaments are considered to fall within the disclosed term "fiber(s)". The term "continuous" for a fiber is considered to be at least 5 cm in length and preferably long enough to constitute at least one entire pattern layer. Furthermore, weaving of one or more fibers has been disclosed, however, other fiber placement, stacking of layering techniques can be used, such as knitting, looping, draping, stitching and sewing. Additionally, multiple fibers or bundles of threads creating a fiber can be used as long as each fiber has a length of about 5 cm or longer in length (preferably much longer) and are placed in the desired orientations rather than having a chopped and substantially random fiber orientation. It should also be appreciated that conventional impeller manufacturing techniques, such as casting, molding machining or stamping can be used with certain aspects of the present invention condensing wave rotor system, however, many advantages of the present invention may not be realized. Alternately, three or more impellers may be coaxially aligned and used in the same compressor to generate higher pressure ratios. It is further envisioned that two or more radial wave rotors can be coaxially aligned and used together, preferably rotating at the same speed, or alternately at different speeds. The examples and other embodiments described herein are exemplary and are not intended to be limiting in describing the full scope of apparatus, systems, compositions, materials, and methods of this invention. Equivalent changes, modifications, variations in specific embodiments, apparatus, systems, compositions, materials and methods may be made within the scope of the present invention with substantially similar results. Such changes, modifications or variations are not to be regarded as a departure from the spirit and scope of the invention.

What is claimed is:

1. An impeller comprising:
    at least one continuous fiber woven to create at least two blades;
    a peripheral shroud around the blades also being created by the at least one continuous fiber;
    segments of the at least one continuous fiber at the blades being elongated substantially transverse to a rotational axis of the blades; and
    at least one electromagnetic fiber attached to the peripheral shroud.

2. The impeller according to claim 1 wherein the at least one electromagnetic fiber is elongated substantially perpendicular to the elongated fiber direction of the peripheral shroud.

3. The impeller according to claim 1 wherein the at least one electromagnetic fiber is elongated substantially parallel to the elongated fiber direction of the peripheral shroud.

4. The impeller according to claim 1 wherein the at least one electromagnetic fiber comprises a material from the group consisting essentially of magnetic fiber, metallic fiber, charged fiber, and quartz.

5. The impeller according to claim 1 wherein the at least one continuous fiber radially extends from one peripheral point of the impeller to a substantially opposite peripheral point of the impeller and defines the at least two blades between the peripheral points.

6. The impeller according to claim 1 wherein elongated fiber segment directions of the at least one continuous fiber defines a star-pattern with the blades.

7. The impeller according to claim 1 wherein elongated fiber segment directions of the at least one continuous fiber defines a sliced pie-pattern with the blades.

8. The impeller according to claim 1 further comprising a resin wetted onto the fiber and the fiber being woven before full curing of the resin, the resin and fiber essentially defining the final structure of the impeller, free of additional metallic or polymeric coatings or layers after weaving.

9. An impeller comprising:
    at least one continuous fiber woven to create at least two blades;
    a peripheral shroud around the blades also being created by the at least one continuous fiber;
    segments of the at least one continuous fiber at the blades being elongated substantially transverse to a rotational axis of the blades; and
    at least one conductive member woven into the peripheral shroud.

10. The impeller according to claim 9 wherein the at least one conductive member is elongated substantially perpendicular to the elongated fiber direction of the peripheral shroud.

11. The impeller according to claim 9 wherein the at least one continuous fiber radially extends from one peripheral point of the impeller to a substantially opposite peripheral point of the impeller and defines the at least two blades between the peripheral points.

12. The impeller according to claim 9 wherein elongated fiber segment directions of the at least one continuous fiber define a star-pattern with the blades.

13. The impeller according to claim 9 wherein elongated fiber segment directions of the at least one continuous fiber define a sliced pie-pattern with the blades.

14. The impeller according to claim 9 further comprising a resin wetted onto the fiber and the fiber being woven before full curing of the resin, the resin and fiber essentially defining the final structure of the impeller, free of additional metallic or polymeric coatings or layers after weaving.

15. A rotatable apparatus comprising:
    at least one continuous and elongated filament including multiple stacked segments defining multiple fluid-working blades; and
    a resin placed on the at least one filament to affix the segments together and to assist in filling in gaps between the segments;
    the at least one filament and resin essentially defining the final structure of the apparatus free of additional metallic or polymeric coatings or layers; and the filament segments defining a star-pattern with the blades such that each of the blades intersects another of the blades.

16. The apparatus according to claim 15 further comprising at least one magnetic member attached to the filament.

17. The apparatus according to claim 15 further comprising at least one conductive member attached to the filament.

18. The apparatus according to claim 15 wherein the filament crosses itself as it continuously extends along the intersecting blades.

19. The apparatus according to claim 15 wherein the blades are part of an impeller in a condensing wave rotor system.

20. The apparatus according to claim 15 further comprising a shaft attaching to a hub area and a shroud surrounding the blades, the filament continuously attaching the shroud to the blades.

21. An impeller comprising:
an elongated fiber defining at least segments of multiple blades, the blades being flexible even when manufacturing of the blades is completed; and
at least one of: (a) a conductive member and (b) a magnetic member, being attached to the fiber adjacent outer portions of the impeller.

22. The impeller according to claim 21 further comprising a shroud attached to and rotatable with the blades, wherein the member is only attached to the shroud.

23. The impeller according to claim 22 wherein the shroud includes the fiber and the shroud is also flexible even when manufacturing of the shroud is completed.

24. The impeller according to claim 21 wherein the member includes a magnetic fiber attached to and being elongated substantially perpendicular to the elongated fiber direction adjacent thereto.

25. The impeller according to claim 21 wherein the member includes a conductive member woven into the elongated fiber.

26. The impeller according to claim 21 wherein the continuous fiber radially extends from one peripheral point of the impeller to a substantially opposite peripheral point of the impeller and defines the blades between the peripheral points.

27. The impeller according to claim 21 further comprising:
a resin wetted onto the fiber and the fiber is woven before full curing of the resin;
the resin, member and fiber essentially defining the final structure of the impeller, free of additional metallic or polymeric coatings or layers after weaving.

28. The impeller according to claim 21 wherein the blades rotate in a condensing wave rotor system.

29. An impeller apparatus comprising at least one continuous and elongated filament including multiple stacked segments defining blades, the filament crossing itself in its final manufactured state, and at least one member being attached to and rotatable with the impeller, the member being at least one of: (a) magnetic, and (b) electrically conductive.

30. The impeller apparatus according to claim 29 wherein the member is an elongated magnetic fiber.

31. The impeller apparatus according to claim 29 wherein the member is an elongated electrically conductive fiber.

32. The impeller apparatus according to claim 29 wherein the member comprises particles substantially suspended in a resin matrix.

33. The impeller apparatus according to claim 29 further comprising a substantially stationary stator disposed adjacent the impeller.

34. The impeller apparatus according to claim 29 wherein the filament segments define a star-pattern with the blades.

35. The impeller apparatus according to claim 29 wherein the filament segments define a sliced pie-pattern with the blades.

36. The impeller apparatus according to claim 29 wherein the blades are part of a condensing wave rotor system.

37. A chilling system comprising at least one compressor, at least one condensing wave rotor, and a primarily water-based refrigerant.

38. The system according to claim 37 further comprising a housing containing the compressor and an evaporator, the outer dimension of the housing and wave rotor combination being less than about two meters by five meters.

39. The system according to claim 37 wherein the at least one wave rotor has three ports.

40. The system according to claim 37 wherein the at least one compressor further comprises an impeller woven from at least one elongated and continuous fiber.

41. The system according to claim 40 wherein the impeller further comprises a hub with a curved end and a substantially frusto-conical side surface.

42. The system according to claim 37 further comprising an electromagnetic stator substantially surrounding an impeller of the compressor, the impeller including at least one of: (a) a conductive member, and (b) a magnetic member.

43. A compressor system comprising:
a first impeller created from a fiber;
a second impeller created from a fiber, the impellers being coaxially aligned; and
a water refrigerant flowing through the impellers.

44. The compressor system according to claim 43 wherein the first impeller further comprises at least two blades and a shroud all of which are defined, at least in part, by the same fiber.

45. The compressor system according to claim 43 further comprising a magnetic member attached to the fiber in the second impeller.

46. The compressor system according to claim 43 further comprising an electromagnetic member attached to the first impeller, the member comprising a material from the group consisting essentially of magnetic fiber, metallic fiber, charged fiber, and quartz.

47. The compressor system according to claim 43 further comprising a second and conductive fiber attached to the main fiber in the first impeller.

48. The compressor system according to claim 47 wherein the conductive fiber is woven substantially perpendicular to the main fiber adjacent thereto.

49. The compressor system according to claim 47 wherein the conductive fiber is attached substantially parallel to the main fiber adjacent thereto.

50. The compressor system according to claim 43 further comprising a conductive fiber attached to the first impeller, the fiber comprising a material from the group consisting essentially of magnetic fiber, metallic fiber, charged fiber, and quartz.

51. The compressor system according to claim 43 wherein the fiber in each of the impellers comprises a material from the group consisting essentially of nylon, carbon fiber, Kevlar, resin wetted carbon fiber, metallic fiber, and polymer based fibers.

52. The compressor system according to claim 43 further comprising at least one wave rotor and the water refrigerant flowing through the wave rotor.

53. The compressor system of claim 43 further comprising a condenser, an evaporator, a wave rotor, and a tank-like housing, the condenser, evaporator, wave rotor and impellers all being located inside the housing.

54. The compressor system of claim 43 wherein each of the impellers includes a hub having at least one protruding curved end.

55. The compressor system of claim 43 wherein each of the impellers includes a shroud and blades made from the associated fiber in a continuous manner, and a resin coating the fiber.

56. The compressor system of claim 43 wherein the impellers rotate in opposite directions.

57. The compressor system of claim 43 further comprising a condenser, an evaporator and a tank-like housing, the condenser, evaporator and impellers all being located inside the housing.

58. A compressor system comprising an impeller created from a fiber, the impeller further comprising at least two blades and a shroud all of which are defined, at least in part, by the same fiber, and a magnetic member woven into the shroud.

59. The compressor system of claim 58 further comprising a water-based refrigerant acting upon the impeller.

60. The compressor system of claim 58 wherein the fiber creating the at least two blades is located in an intersecting and crossing manner.

61. A compressor system comprising an impeller created from a fiber, and a magnetic member attached to the fiber, wherein the magnetic member is woven substantially perpendicular to the fiber adjacent thereto.

62. The compressor system of claim 61 further comprising a water-based refrigerant acting upon the impeller.

63. A method of manufacturing an impeller, the method comprising:
    layering at least one fiber to create at least two vanes and a peripheral component, with a majority of the fiber layers in the vanes inwardly extending in a substantially radial direction; and
    wetting the at least one fiber with a resin,
    wherein the resin comprises a material that is electrically conductive.

64. The method according to claim 63 wherein the resin comprises a magnetic material.

65. The method according to claim 63 further comprising layering at least one electrically conductive member in the peripheral component.

66. The method according to claim 63 further comprising layering at least one magnetic member in the peripheral component.

67. The method according to claim 63 further comprising automatically weaving the fiber through a tube.

68. A method of manufacturing an impeller, the method comprising:
    weaving at least one fiber to construct at least two blades and a shroud; and
    placing at least one member into the shroud, the member being at least one of: (a) electrically conductive, and (b) magnetic.

69. The method according to claim 68 further comprising weaving a conductive member into the shroud.

70. The method according to claim 68 further comprising wetting the fiber with a resin before the weaving.

71. The method according to claim 70 further comprising hardening the resin after the weaving.

72. The method according to claim 68 further comprising filling gaps between layers of the fiber with a resin, wherein the resin includes the member.

73. The method according to claim 68 further comprising attaching a drive shaft to the impeller.

74. The method according to claim 73 further comprising weaving the drive shaft into a centerpoint of the impeller.

75. A method according to claim 73 further comprising constructing the at least two blades by crossing the fiber at a centerpoint of the impeller.

76. The method according to claim 73 further comprising constructing the at least two blades by creating an opening in a center area of the impeller.

77. A method of making a machine, the method comprising:
    (a) layering segments of at least one filament in a stacked manner to create fluid-working blades; and
    (b) mounting a wave rotor in fluid communication with the blades.

78. The method according to claim 77 further comprising weaving the filament segments defining the blades in a star-pattern.

79. The method according to claim 77 further comprising weaving the filament segments defining the blades in a sliced pie-pattern.

80. The method according to claim 77 further comprising making the filament as a rotatable member inside of an electric motor.

81. The method according to claim 77 further comprising assembling a water-based refrigerant, condensing wave rotor.

82. The method according to claim 77 further comprising making an impeller from the filament without additional coating or molding after weaving the filament.

83. A system comprising a first impeller and at least a second impeller rotating about a common axis, each of the impellers comprising multiple blades including at least one continuous fiber having a stacked arrangement on the blades, and a shroud attached to and surrounding a periphery of the blades of one of the impellers, the shroud rotating with the attached impeller.

84. The system of claim 83, wherein the common axis is substantially vertically elongated.

85. The system of claim 83, wherein the impellers act as refrigerant compressors.

86. A system comprising a first impeller and at least a second impeller rotating about a common axis, each of the impellers comprising multiple blades including at least one continuous fiber having a stacked arrangement on the blades, and the continuous fiber extending from at least a pair of the blades to a segment of a shroud so the shroud and blades are integral and a single piece.

87. A system comprising a first impeller and at least a second impeller rotating about a common axis, each of the impellers comprising multiple blades including at least one continuous fiber having a stacked arrangement on the blades, and the second impeller rotating in an opposite direction than the first impeller.

88. The system of claim 87, further comprising a shroud attached to and surrounding a periphery of the blades of one of the impellers, the shroud rotating with the attached impeller.

89. The system of claim 87, wherein the common axis is substantially vertically elongated.

90. The system of claim 87, wherein the impellers act as refrigerant compressors.

91. The system of claim 87, wherein the fiber crosses itself as it continuously extends along the intersecting blades in each of the impellers.

92. A system comprising:
a first impeller and at least a second impeller rotating about a common axis;
each of the impellers comprising multiple blades including at least one continuous fiber having a stacked arrangement on the blades;
the first impeller rotating at a different speed than the second impeller;
at least a second elongated fiber also defining part of the blades of the first impeller, and stacked layers of the fibers of the first impeller being adhered together; and
each of the fibers of the first impeller having a length of at least five cm.

* * * * *

UNITED STATES PATENT AND TRADEMARK OFFICE
CERTIFICATE OF CORRECTION

PATENT NO. : 7,938,627 B2
APPLICATION NO. : 11/667373
DATED : May 10, 2011
INVENTOR(S) : Norbert Müller It is certified that error appears in the above-identified patent and that said Letters Patent is hereby corrected as shown below:

In the Specifications

Column 1, line 29, "Pat. No." should be --patents--.

Column 3, line 29, "FIGS. 27" should be --FIG. 27--.

Column 4, line 23, "fist tank" should be --first tank--.

Column 5, line 21, "0.25, to 6.0, percent" should be --0.25 to 6.0 percent--.

Column 5, line 46, "(33, to 35, Msi)" should be --(33 to 35 Msi)--.

Column 5, line 47, "(40, to 50, Msi)" should be --(40 to 50 Msi)--.

Column 5, line 47, "(50, to 70, Msi)" should be --(50 to 70 Msi)--.

Column 5, lines 47-48, "(70, to 140, Msi)" should be --(70 to 140 Msi)--.

Column 5, line 55, after "20" delete ",".

Column 5, line 56, "500, ksi" should be --500 ksi--.

Column 6, line 40, "flexile" should be --flexible--.

Column 7, line 8, "should 273" should be --shroud 273--.

Column 7, line 10, "remove" should be --removed--.

Column 7, line 34, "FIGS. 18h" should be --FIG. 18h--.

Column 7, line 35, "180" should be --18o--.

Column 7, line 40, "FIG." should be --FIGS.--.

Column 7, line 64, after "3" delete ",".

Column 8, line 54, after "200" delete ",".

Column 8, line 57, "2, to 4," should be --2 to 4--.

Column 8, line 59, "2.5," should be --2.5--.

Column 8, line 60, "300," should be --300--.

Signed and Sealed this
Eleventh Day of June, 2013

Teresa Stanek Rea
*Acting Director of the United States Patent and Trademark Office*

CERTIFICATE OF CORRECTION (continued)
U.S. Pat. No. 7,938,627 B2

Column 8, line 62, "15," should be --15--.

Column 9, line 43, "500," should be --500--.

Column 10, line 16, "1994;," should be --1994;--.

Column 10, line 17, "1993;," should be --1993;--.

Column 10, line 18, "1999;," should be --1999;--.

Column 10, line 19, "1999;," should be --1999;--.

Column 10, line 20, "2002;," should be --2002;--.

Column 10, line 21, "2002;," should be --2002;--.

Column 10, line 22, "2003;," should be --2003;--.

Column 11, line 13, "R718," should be --R718--.

Column 11, line 23, "R718," should be --R718--.

Column 11, line 38, "flows" should be --flowing--.

Column 14, line 15, "5," should be --5--.

Column 14, line 16, "4.7," should be --4.7--.

Column 14, line 17, "2," should be --2--.

Column 14, line 33, "exists" should be --exits--.

Column 15, line 38, "molding" should be --molding,--.